(12) United States Patent
Matsuno

(10) Patent No.: US 6,390,566 B1
(45) Date of Patent: May 21, 2002

(54) VEHICLE BRAKING SYSTEM

(75) Inventor: Isao Matsuno, Nagano (JP)

(73) Assignee: Nissin Kogyo Co., Ltd., Nagano-Ken (JP)

( * ) Notice: Subject to any disclaimer, the term of this patent is extended or adjusted under 35 U.S.C. 154(b) by 0 days.

(21) Appl. No.: 09/575,823

(22) Filed: May 22, 2000

(30) Foreign Application Priority Data

May 25, 1999 (JP) ............................................ 11-145490
Jun. 7, 1999 (JP) ............................................ 11-159406

(51) Int. Cl.$^7$ ............................................ B60T 13/00
(52) U.S. Cl. .................. 303/9.64; 303/9.72; 303/115.5; 188/345
(58) Field of Search ............................... 303/9.62, 9.64, 303/9.71, 9.72, 11, 115.5; 188/345

(56) References Cited

U.S. PATENT DOCUMENTS

| | | | | |
|---|---|---|---|---|
| 4,465,322 A | * | 8/1984 | Hayashi ...................... | 303/9.64 |
| 5,150,951 A | * | 9/1992 | Leiber et al. ............... | 303/186 |
| 5,234,086 A | * | 8/1993 | Matsuda et al. ............ | 188/358 |
| 5,273,346 A | * | 12/1993 | Tsuchida et al. ............... | 303/2 |
| 5,620,237 A | * | 4/1997 | Iwashita et al. ........... | 303/9.64 |
| 5,700,067 A | * | 12/1997 | Heubner ................. | 303/122.13 |
| 6,053,582 A | * | 4/2000 | Ganzle ..................... | 303/113.3 |
| 6,070,949 A | * | 6/2000 | Hariu et al. ............... | 303/9.61 |

FOREIGN PATENT DOCUMENTS

| | | |
|---|---|---|
| JP | 62-25550 | 6/1987 |
| JP | 5-50972 | 3/1993 |

* cited by examiner

*Primary Examiner*—Christopher P. Schwartz
*Assistant Examiner*—Bradley King
(74) *Attorney, Agent, or Firm*—McGuireWoods, LLP

(57) ABSTRACT

There are provided a master cylinder M and proportional pressure intensification valves V1, V2 for each drawing a boosting hydraulic pressure in proportion to an output hydraulic pressure outputted from the master cylinder M from a source of hydraulic pressure S into a hydraulic pressure boosting chamber 30, wherein one of pairs of front wheel brakes Bfa, Bfb and rear wheel brakes Bra, Brb connects to output ports $1_1$, $1_2$ of the master cylinder M, and the other pair connects to the hydraulic pressure boosting chambers 30 of the respective proportional pressure intensification valves V1, V2. Accordingly, it is possible to provide a vehicle braking system comprising proportional pressure intensification valves for generating a boosted hydraulic pressure intensified in proportion to an output hydraulic pressure outputted from a master cylinder without any increase in unsprung load of the vehicle.

13 Claims, 9 Drawing Sheets

VEHICLE BRAKING SYSTEM

BACKGROUND OF THE INVENTION

The present invention relates to a vehicle braking device.

In addition, the present invention relates to an improved vehicle braking system wherein output ports of a master cylinder operated by an operator are connected to one of a front wheel brake and a rear wheel brake and to a pressure intensification mechanism for generating a hydraulic pressure intensified in response to a hydraulic pressure outputted from the output port of the master cylinder, whereby the other of the front wheel brake and the rear wheel brake is operated by virtue of the hydraulic pressure generated from the pressure intensification mechanism.

Further, the present invention also relates a braking system for automotive two-wheeled vehicles, and in particular to a braking system for automotive two-wheeled vehicles in which a primary wheel cylinder and a secondary wheel cylinder are provided on a wheel brake means for braking a wheel which are adapted to cause the wheel the brake means to operate when supplied with hydraulic pressure, respectively.

The vehicle braking system is disclosed, for example, in a Japanese Patent Unexamined Publication No. Hei. 5-50972 and is already known.

In the vehicle braking system disclosed therein, the pressure intensification mechanism is constituted by a secondary master cylinder operated by a reaction torque when a front wheel brake is operated by a hydraulic pressure outputted from a front wheel master cylinder.

Therefore, functionally, the secondary master cylinder has to be disposed in the vicinity of the wheel and this increases the unsprung load (that is, non-suspended mass) of the vehicle, slightly deteriorating the riding comfort of the vehicle.

In addition, the other braking system for automotive two-wheeled vehicles, is known by for example, Japanese Patent Examined Publication No. Sho. 62-25550. The braking system is constituted in such a manner that first and second disc brakes are disposed on sides of a front wheel, in which an output port of a primary master cylinder for generating a hydraulic pressure when operated by an operator connects to a wheel cylinder of the first disc brake, in which a secondary master cylinder is mounted on a front fork which is adapted to be caused to operate by virtue of a rotational torque which the secondary master cylinder receives from the front wheel in conjunction with the operation of the first disc brake, and in which an output port of this secondary master cylinder connects to a wheel cylinder of a second disc brake. According to this conventional braking system, when the first disc brake is in operation by virtue of a hydraulic pressure outputted from the primary master cylinder, the secondary master cylinder is caused to operate by making use of the rotational torque of the front wheel, and the second disc brake is then caused to operate by virtue of a hydraulic pressure outputted from the secondary master cylinder. Therefore, a great magnitude of braking force can be provided even by applying a relatively small magnitude of operating force to the primary master cylinder, whereby a nimble braking operation can be performed.

In the conventional braking system as described above, since the secondary master cylinder adapted to operate by virtue of the rotational torque of the wheel has to be disposed in the vicinity of the wheel from the functional point of view, the secondary master cylinder increases the unsprung load of an automotive two-wheeled vehicle, and this somehow functions to deteriorate the riding comfort of the vehicle.

SUMMARY OF THE INVENTION

The present invention was made in view of the above situations.

It is an object of the present invention to provide an improved vehicle braking system in which a sufficient magnitude of braking force can be provided without increasing the unsprung load of the vehicle.

In addition, it is an object of a first aspect of the present invention to provide a vehicle braking system comprising a proportional pressure intensification valve for generating a boosting hydraulic pressure intensified in proportion to a hydraulic pressure outputted from a master cylinder without increasing the unsprung load of the vehicle.

The object can be achieved by a vehicle braking system, according to the present invention, comprising:
 a front wheel brake;
 a rear wheel brake;
 a master cylinder adapted to be operated by an operator, the master cylinder having output ports of the master cylinder which are connected to one of the front wheel brake and the rear wheel brake;
 a hydraulic pressure source; and
 a proportional pressure intensification valve for drawing a boosting hydraulic pressure in proportion to a hydraulic pressure outputted from the master cylinder from the hydraulic pressure source into a hydraulic pressure boosting chamber thereof,
 wherein the hydraulic pressure boosting chamber of the proportional pressure intensification valve is connected to the other of the front wheel brake and the rear wheel brake.

In addition, the object can be achieved by a braking system for automotive two-wheeled vehicle, according to the present invention, comprising:
 a wheel brake mechanism for braking a wheel, the wheel brake mechanism having a primary wheel cylinder and a secondary wheel cylinder and are adapted to cause the wheel brake mechanism operate when the primary and secondary wheel cylinders are supplied with hydraulic pressure, respectively;
 a master cylinder adapted to be operated by an operator, the master cylinder having an output port which connects to the primary wheel cylinder;
 a hydraulic pressure source including a hydraulic pump; and
 a proportional pressure intensification valve for drawing a boosting hydraulic pressure in proportion to a hydraulic pressure outputted from the master cylinder from the hydraulic pressure source into a hydraulic pressure boosting chamber thereof, the hydraulic pressure boosting chamber being connected to the secondary wheel cylinder.

Further, it is also an object of a second aspect of the present invention to provide a braking system for automotive two-wheeled vehicle which is constructed so as to braking a wheel of the vehicle in a nimble fashion without increasing the unsprung load thereof.

The aforesaid object, in particularly the aforesaid object of the first aspect of the present invention can be attained by the first to eight feature explained below according to the present invention.

According to a first feature of the invention, there is provided a vehicle braking system comprising a master cylinder adapted to be operated by an operator, a source of hydraulic pressure and proportional pressure intensification valves for each drawing a boosting hydraulic pressure in proportion to a hydraulic pressure outputted from the master cylinder from the source of hydraulic pressure into a hydraulic pressure boosting chamber thereof, wherein output ports of the master cylinder are connected to one of pairs of front wheels and rear wheels and wherein the output chambers of the proportional pressure intensification valves are connected to the other pair of the pairs of front wheels and rear wheels.

According to this first feature of the invention, the hydraulic pressure outputted from the master cylinder is supplied to one of the pairs of front wheel brakes and rear wheel brakes for operating the same when the master cylinder is in operation. In addition, the proportional pressure intensification valves draw the boosting hydraulic pressure intensified in proportion to the hydraulic pressure outputted from the master cylinder from the source of hydraulic pressure into the hydraulic pressure boosting chambers thereof for supplying the boosting hydraulic pressure to the other of the pairs of front wheel brakes and rear wheel brakes for operating the same.

Thus, since the proportional pressure intensification valves are adapted to draw the boosting hydraulic pressures intensified in proportion to the hydraulic pressure outputted from the master cylinder from the source of hydraulic pressure for supplying it to the other wheel brake, these proportional pressure intensification valves and the source of hydraulic pressure can freely be mounted on the vehicle body frame at positions higher than the vehicle suspension springs, and such mounting can suppress the increase in the unsprung load of the vehicle, thereby making it possible to maintain the good riding comfort.

Since almost all of the pressurized fluid delivered by the master cylinder is supplied to the one pair of wheel brakes, the amount of pressurized fluid to be delivered by the master cylinder or the length of the operating stroke of an operating member of the master cylinder can be suppressed to a low level.

On the other hand, even if the other pair of wheel brakes that are operated by virtue of the boosting hydraulic pressure is miniaturized, a sufficient magnitude of braking force can be provided.

According to a second feature of the invention, there is provided a vehicle braking system wherein one of a front wheel brake and a rear wheel brake constitutes a first wheel brake and the other does a second wheel brake, wherein a primary wheel cylinder and a secondary wheel cylinder which are independent from each other are provided on at least the first wheel brake, and wherein output ports of a first master cylinder and a second master cylinder which are individually operated by an operator are connected, respectively, to the primary wheel cylinder of the first wheel brake. and a wheel cylinder of the second wheel brake, and comprising a source of pressurized fluid and a proportional pressure intensification valve for drawing a boosting hydraulic pressure in proportion to a hydraulic pressure outputted from the first master cylinder into a hydraulic pressure boosting chamber thereof, the hydraulic pressure boosting chamber of the proportional pressure intensification valve being connected to a secondary wheel cylinder of the second wheel brake.

According to this second feature of the invention, in a vehicle such as an automotive two-wheeled vehicle provided with first and second master cylinders for operating a first wheel brake (for example, a front wheel brake) and a second wheel brake (for example, a rear wheel brake), respectively, even when only the first master cylinder is in operation, the hydraulic pressure outputted therefrom operates the first wheel brake and the hydraulic pressure so outputted is also applied to the proportional pressure intensification valve and the boosting hydraulic pressure in proportion to the outputted hydraulic pressure is drawn from the source of hydraulic pressure, by virtue of which the second wheel brake is operated, thus making it possible to operate the first and second brakes in conjunction with each other.

In this case, too, since the proportional pressure intensification valve and the source of pressure can be mounted on the vehicle body frame at positions higher than the suspension springs of the vehicle, such mounting can suppress the increase in the unsprung load of the vehicle, thereby making it possible to maintain the good riding comfort. In addition, since almost all of the pressurized fluid delivered by the first master cylinder is supplied to the first wheel brake, the amount of pressurized fluid so delivered thereby or the length of the operating stroke of the first master cylinder can be maintained small.

Furthermore, according to a third feature of the invention, there is provided a vehicle braking system wherein a primary wheel cylinder and a secondary wheel cylinder which are independent from each other are provided on a front wheel brake, wherein a primary wheel cylinder and a secondary wheel cylinder which are independent from each other are provided on a rear wheel brake, and wherein output ports of a front wheel master cylinder and a rear wheel master cylinder which are individually operated by an operator are connected, respectively, to the primary wheel cylinder of the front wheel brake and the primary wheel cylinder of the rear wheel brake, and comprising a source of pressurized fluid, a first proportional pressure intensification valve for drawing a boosting hydraulic pressure in proportion to a hydraulic pressure outputted from the front wheel master cylinder from the source of hydraulic pressure into a hydraulic pressure boosting chamber thereof, and a second proportional pressure intensification valve for drawing a boosting hydraulic pressure in proportion to a hydraulic pressure outputted from the rear wheel master cylinder from the source of hydraulic pressure into a hydraulic pressure boosting chamber thereof, the hydraulic pressure boosting chamber of the first proportional pressure intensification valve being connected to the secondary wheel cylinder of the rear wheel brake and the hydraulic pressure boosting chamber of the second proportional pressure intensification valve being connected to the secondary wheel cylinder of the front wheel brake.

According to this third feature of the invention, a vehicle such as an automotive two-wheeled vehicle provided with a front wheel master cylinder and a rear wheel master cylinder for operating a front wheel brake and a rear wheel brake, respectively, even when only the front wheel master cylinder is in operation, the hydraulic pressure outputted therefrom is supplied to the primary wheel cylinder of the front wheel brake, and the same hydraulic pressure so outputted is also applied to the first proportional pressure intensification valve to thereby draw the boosting hydraulic pressure in proportion to the outputted hydraulic pressure from the source of hydraulic pressure for supply to the secondary wheel cylinder of the rear wheel brake, whereby the front and rear wheel brakes can be operated together.

In addition, even when only the rear wheel master cylinder in operation, the hydraulic pressure outputted therefrom is supplied to the primary wheel cylinder of the rear wheel brake, and the same hydraulic pressure so outputted is also applied to the second proportional pressure intensification valve to thereby draw the boosting hydraulic pressure in proportion to the outputted hydraulic pressure from the source of hydraulic pressure for supply to the secondary wheel cylinder of the front wheel brake, whereby the front and rear wheel brakes can be operated together.

In this case, too, since the first and second proportional pressure intensification valves and the source of hydraulic pressure can freely be mounted on the vehicle body frame at positions higher than the suspension springs of the vehicle, such mounting can suppress the increase in the unsprung load of the vehicle, thereby making it possible to maintain the good riding comfort. In addition, since almost all of the pressurized fluid delivered by the front wheel master cylinder is supplied to the front brake and almost all of the pressurized fluid delivered by the rear wheel master cylinder is supplied to the rear wheel brake, the amounts of the pressurized fluid delivered by the respective master cylinders can be small and therefore, the lengths of the operating strokes of the respective master cylinders can be maintained short.

Furthermore, according to a fourth feature of the invention, there is provided a vehicle braking system wherein first and second proportional pressure intensification valves are constructed such that output characteristics thereof are differentiated from each other.

According to this fourth feature of the invention, the operating characteristics of the front and rear wheel brakes can be differentiated by differentiating the output characteristics of the first and second proportional pressure intensification valves, whereby a braking system can be provided for a vehicle relatively easily which can meet an application thereof.

Moreover, according to a fifth feature of the invention, in addition to the third feature of the invention, there is provided a vehicle braking system, wherein the effective pressure receiving area of the secondary wheel cylinder of the front wheel brake is set smaller than the effective pressure receiving area of the primary wheel cylinder of the rear wheel brake, while the effective pressure receiving area of the secondary wheel cylinder of the rear brake is set smaller than the effective pressure receiving area of the primary wheel cylinder of the front brake, whereby the braking force of the front wheel becomes larger than that of the rear wheel brake when the front wheel master cylinder is in operation, while the braking force of the rear wheel brake becomes larger than that of the front wheel brake when the rear wheel master cylinder is in operation.

According to the fifth feature of the invention, when the front wheel master cylinder is in operation, a state is provided in which the front and rear wheel brakes operate in an interlocking fashion with importance being attached to braking by the front wheel brake, while when the rear wheel master cylinder is in operation, a state is provided in which the front and rear wheel brakes operate in an interlocking fashion with importance being attached to braking by the rear wheel brake, thereby making it possible to obtain a good braking feeling free from a feeling of physical disorder as felt with a non-interlocking braking system for general automotive two-wheeled vehicles.

In addition, according to a sixth feature of the invention, in addition to any of the second to fifth features, there is provided a vehicle braking system wherein the proportional pressure intensification valves are constructed such that the proportional pressure intensification valves start to operate after the hydraulic pressures outputted from the master cylinders corresponding thereto increase to exceed certain levels.

According to this sixth feature of the invention, a delay in operation initiating timing can be provided between the one of the wheel brakes which is operated by virtue of the hydraulic pressure outputted from the master cylinders and the other wheel brake operated by virtue of the boosted hydraulic pressure outputted from the proportional pressure intensification valves.

Furthermore, according to a seventh feature of the invention, in addition to any of the third to fifth features, there is provided a vehicle braking system wherein the second proportional pressure intensification valve is constructed such that the second proportional pressure intensification valve starts to operate after the hydraulic pressure outputted from the rear wheel master cylinder increases to exceed a certain level.

According to this seventh feature of the invention, when the rear wheel master cylinder is in operation, the operation initiating timing of the front wheel brake is delayed from that of the rear wheel brake, whereby jackknifing of the vehicle body can be prevented.

Moreover, according to an eighth feature of the invention, in addition to any of the second to seventh features, there is provided a vehicle braking system wherein an operation stopping means is provided on the source of hydraulic pressure for optionally stopping the operation of the source of hydraulic pressure.

According to this eighth feature of the invention, the functions of the proportional pressure intensification valves can be stopped by stopping the operation of the source of hydraulic pressure by operating the operation stopping means. With this construction, the front and rear wheel brakes can be operated in the general and conventional independent mode as required.

The aforesaid object, in particularly the aforesaid object of the second aspect of the present invention can be attained by the ninth to eleventhh feature explained below according to the present invention.

According to a ninth feature of the invention, there is provided a braking system for automotive two-wheeled vehicles in which a primary wheel cylinder and a secondary wheel cylinder are provided on a wheel brake means for braking a wheel which are adapted to cause the wheel brake means to operate when the primary and secondary wheel cylinders are supplied with hydraulic pressure, respectively, characterized in that an output port of a master cylinder connects to the primary wheel cylinder, and that a hydraulic pressure boosting chamber of a proportional pressure intensification valve for drawing a boosting hydraulic pressure in proportion to a hydraulic pressure outputted from the master cylinder from a source of hydraulic pressure including a hydraulic pump connects to the secondary wheel cylinder.

According to this ninth feature of the invention, when the master cylinder is in operation, the output hydraulic pressure outputted therefrom is supplied to the primary wheel cylinder, and the boosted hydraulic pressure outputted in proportion to the output hydraulic pressure from the master cylinder from the proportional pressure intensification valve is supplied to the secondary wheel cylinder, and therefore, the operator only has to apply a relative small magnitude of operation force to the master cylinder to strongly brake the front wheel.

Moreover, the source of hydraulic pressure and the proportional pressure intensification valve which are used to supply the boosted pressure to the wheel brake means can be freely mounted on an upper portion of a front fork or a body frame of the automotive two-wheeled vehicle at positions higher than the suspension springs thereof, and such mounting can help suppress the increase in unsprung load of the automotive two-wheeled vehicle, thereby making it possible to maintain the good riding comfort.

Furthermore, should there occur a failure in the source of hydraulic pressure, thereby making it impossible for the proportional pressure intensification valve to output any pressure, since the output hydraulic pressure outputted from the master cylinder can be supplied to the primary wheel cylinder, the wheel brake means is allowed to operate normally, a fail-safe function being thereby secured.

In addition to the first feature, according to a tenth feature of the invention, there is provided a braking system for automotive two-wheeled vehicles, wherein the wheel brake means comprises a disc brake disposed on at least one side of the wheel and wherein the primary and secondary wheel cylinders are disposed together on a caliper of the disc brake.

According to this tenth feature, the construction of the wheel brake means can be simplified.

In addition to the ninth feature, according to a eleventh feature of the invention, there is provided a braking system, wherein the wheel brake means comprises first and second disc brakes disposed on both sides of the wheel and wherein a wheel cylinder of the first disc brake is made to function as the primary wheel cylinder, while a wheel cylinder of the second disc brake is made to function as the secondary wheel cylinder.

According to this eleventh feature, the braking effect of the wheel can be improved.

Further, the above-mentioned object can be attained by a braking system for vehicle, according to the present invention comprising:

a first brake member ($106_1$, $106_2$; $54_1 54_2$);

a second brake member ($106_2$, $106_1$; $54_2$, $54_1$) independent from the first brake member;

a master cylinder (M, Mf, Mr) adapted to be operated by an operator, the master cylinder having output port which is connected to the first brake member;

a hydraulic pressure source (107, S); and a proportional pressure intensification valve (V, V1, V2) for drawing a boosting hydraulic pressure in proportion to a hydraulic pressure outputted from the master cylinder (M, Mf, Mr) from the hydraulic pressure source (107, S) into a hydraulic pressure boosting chamber (130, 30) thereof, wherein the hydraulic pressure boosting chamber of the proportional pressure intensification valve is connected to the second brake member.

In the above-mentioned braking system, it is advantageous that the vehicle comprises front and rear wheel brake mechanisms (B, Bf, Br), at least one of the front and rear wheel brake mechanisms (B, Bf, Br) has a primary wheel cylinder ($106_1$, $54_1$) and a secondary wheel cylinder ($106_2$, $54_2$) which are adapted to cause the at least one when the primary and secondary wheel cylinders ($106_1$, $106_2$; $54_1$, $54_2$) are supplied with hydraulic pressure, and the first brake member ($106_1$, $54_1$) is the primary wheel cylinder ($106_1$, $54_1$) of the at least one of front and rear wheel brake mechanisms, and the second brake member ($106_2$, $54_2$) is the secondary wheel cylinder ($106_2$, $54_2$) of the at least one of front and rear wheel brake mechanisms.

Further, in the braking system for vehicle according to the present invention, it is further advantageous that the vehicle is an automotive two-wheeled vehicle, the at least one of front and rear wheel brake mechanisms (B, Bf) comprises a disc brake disposed on at least one side of the respective wheel (Wf), and the primary and secondary wheel cylinders ($106_1$, $106_2$) are disposed together on a caliper (104) of the disc brake.

In addition, the braking system for vehicle according to the present invention, it is preferable that the vehicle is an automotive two-wheeled vehicle, the at least one of the front rear wheel brake mechanisms (Bf) comprises first and second disc brakes (B1, B2) disposed on both sides of the respective wheel (Wf) and wherein a wheel cylinder of the first disc brake (B1) is made to function as the primary wheel cylinder ($106_1$), while a wheel cylinder of the second disc brake (B2) is made to function as the secondary wheel cylinder ($106_2$).

Further, in the above-mentioned braking system for vehicle according to the present invention, it is preferred that the vehicle comprises front and rear wheel brake mechanisms (Bf, Br), each of the front and rear wheel brake mechanisms (Bf, Br) has a wheel cylinder ($54_1$, $54_2$) which is adapted to cause the respective wheel brake mechanism, the first brake member is the wheel cylinder ($54_1$) of one of the front and rear wheel brake mechanisms (Bf), and the second brake member is the wheel cylinder ($54_2$) of the other of the front and rear wheel brake mechanisms (Br).

Furthermore, in the braking system for vehicle according to the present invention, it is advantageous that the vehicle comprises front and rear wheel brake mechanisms (Bf, Br), each of the front and rear wheel brake mechanisms has a primary wheel cylinder ($54_1$) and a secondary wheel cylinder ($54_2$) which are adapted to cause the respective wheel brake mechanism, and the first brake member is the primary wheel cylinder ($54_1$) of one of the front and rear wheel brake mechanisms (Bf), and the second brake member is the secondary wheel cylinder ($54_2$) of the other of the front and rear wheel brake mechanisms (Br).

Moreover, in the above-mentioned construction of the vehicle braking system, it is more advantageous that the master cylinder (M) comprises a front wheel master cylinder (Mf) with output port ($55_1$) connected to the primary wheel cylinder ($54_1$) of the front wheel brake (Bf), and also a rear wheel master cylinder (Mr) with output port ($55_2$) connected to the primary wheel cylinder ($54_1$) of the rear wheel brake (Br), the front and wheel master cylinders (Mf, Mr) being independently operated by the operator, and the pressure intensificaiton valve (V1, V2) comprises a first proportional pressure intensification valve (V1) for drawing a boosting hydraulic pressure in proportion to a hydraulic pressure outputted from the front wheel master cylinder (Mf) from the source of hydraulic pressure (S) into a hydraulic pressure boosting chamber (30) thereof, and a second proportional pressure intensification valve (V2) for drawing a boosting hydraulic pressure in proportion to a hydraulic pressure outputted from the rear wheel master cylinder (Mr) from the source of hydraulic pressure (S) into a hydraulic pressure boosting chamber (30) thereof, wherein the hydraulic pressure boosting chamber (30) of the first proportional pressure intensification valve (V1) is connected to the secondary wheel cylinder ($54_2$) of the rear wheel brake (Br), and the hydraulic pressure boosting chamber (30) of the second proportional pressure intensification valve (V2) is connected to the secondary wheel cylinder ($54_2$) of the front wheel brake (Bf).

Further, in the vehicle braking system according to the present invention, it is preferred that the first and second proportional pressure intensification valves (V1, V2) are different in its output characteristic from each other.

Furthermore, in the vehicle braking system according to the present invention, it is advantageous that the effective pressure receiving area of the secondary wheel cylinder ($54_2$) of the front wheel brake (Bf) is set smaller than the effective pressure receiving area of the primary wheel cylinder ($54_1$) of the rear wheel brake (Br), while the effective pressure receiving area of the secondary wheel cylinder ($54_2$) of the rear wheel brake (Br) is set smaller than the effective pressure receiving area of the primary wheel cylinder ($54_1$) of the front wheel brake (Bf).

Moreover, in the vehicle braking system, the proportional pressure intensification valve (V1, V2) maybe constructed such that the proportional pressure intensification valve (V1, V2) starts to operate after the hydraulic pressures outputted from the master cylinder (Mf, Mr) is reached to a predetermined value or more.

In addition, in the vehicle braking system according to the present invention, the second proportional pressure intensification valve (V2) may be constructed such that the second proportional pressure intensification valve starts to operate after the hydraulic pressure outputted from the rear wheel master cylinder (Mr) is reached to a predetermined value or more.

Further, in the vehicle braking system, an operation stopping mechanism (60) may be provided on the hydraulic pressure source (S) for optionally stopping the operation of the source of hydraulic pressure (S).

DETAILED DESCRIPTION OF THE PREFERRED EMBODIMENTS

Modes for carrying out the invention will be described below based on embodiments of the invention shown in the accompanying drawings.

Figure 1:
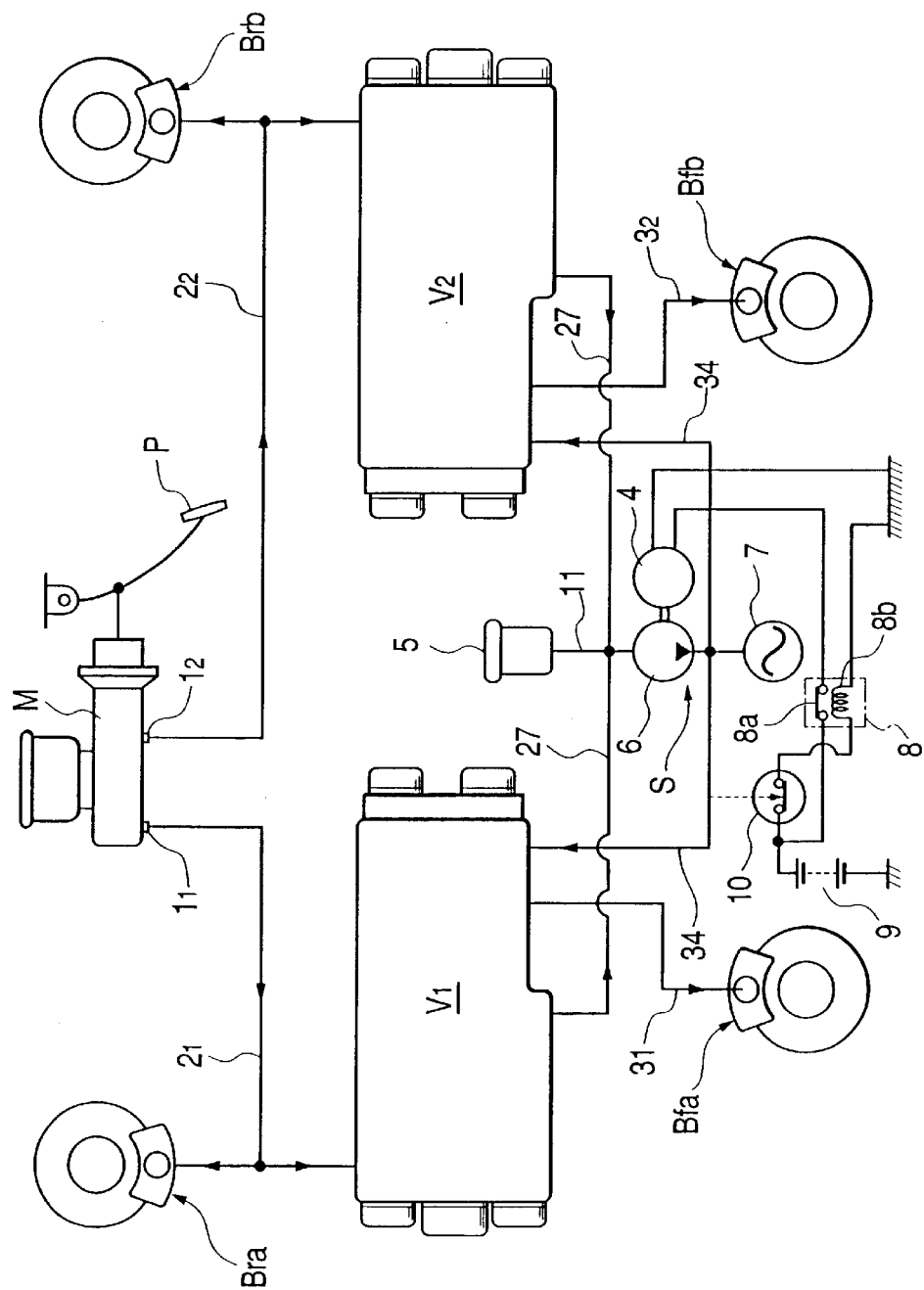
FIG. 1 shows a hydraulic circuit diagram of an automotive vehicle braking system according to a first embodiment of the present invention.
Figure 2:
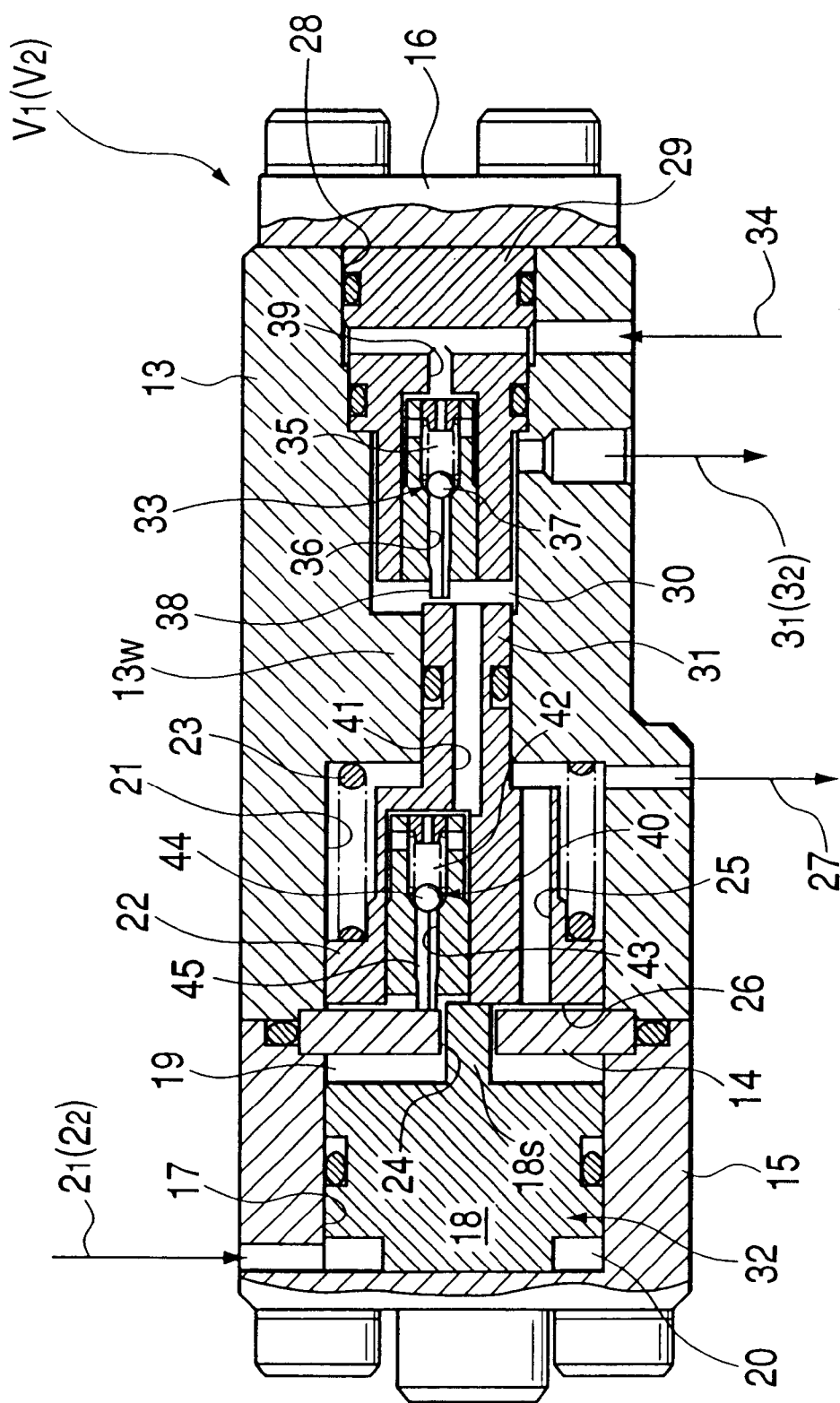
FIG. 2 shows an enlarged longitudinal sectional view of a proportional pressure intensification valve shown in FIG. 1.
Figure 3:
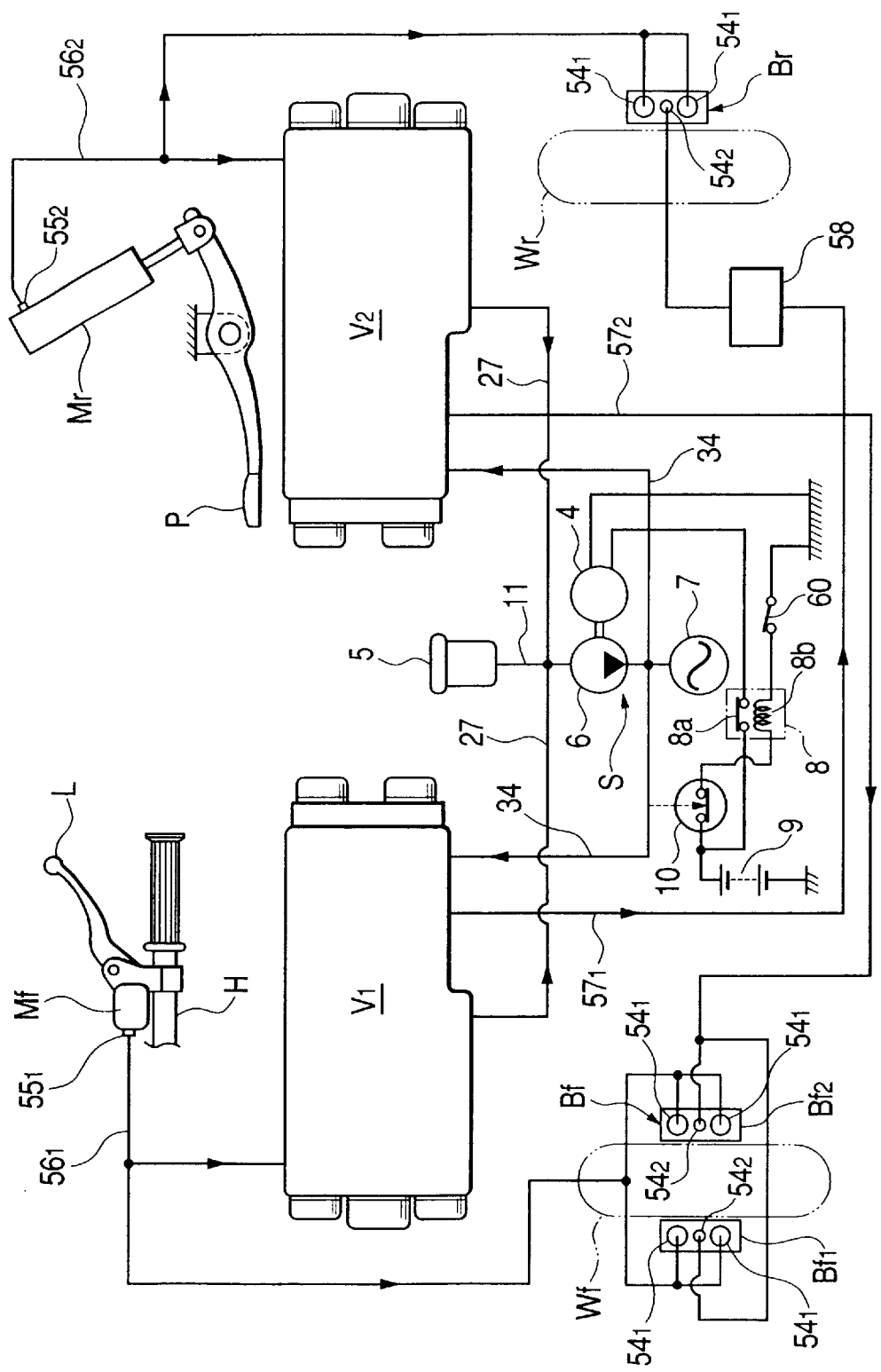
FIG. 3 shows a hydraulic circuit diagram of an automotive two-wheeled vehicle braking system according to a second embodiment of the present invention.
Figure 4:
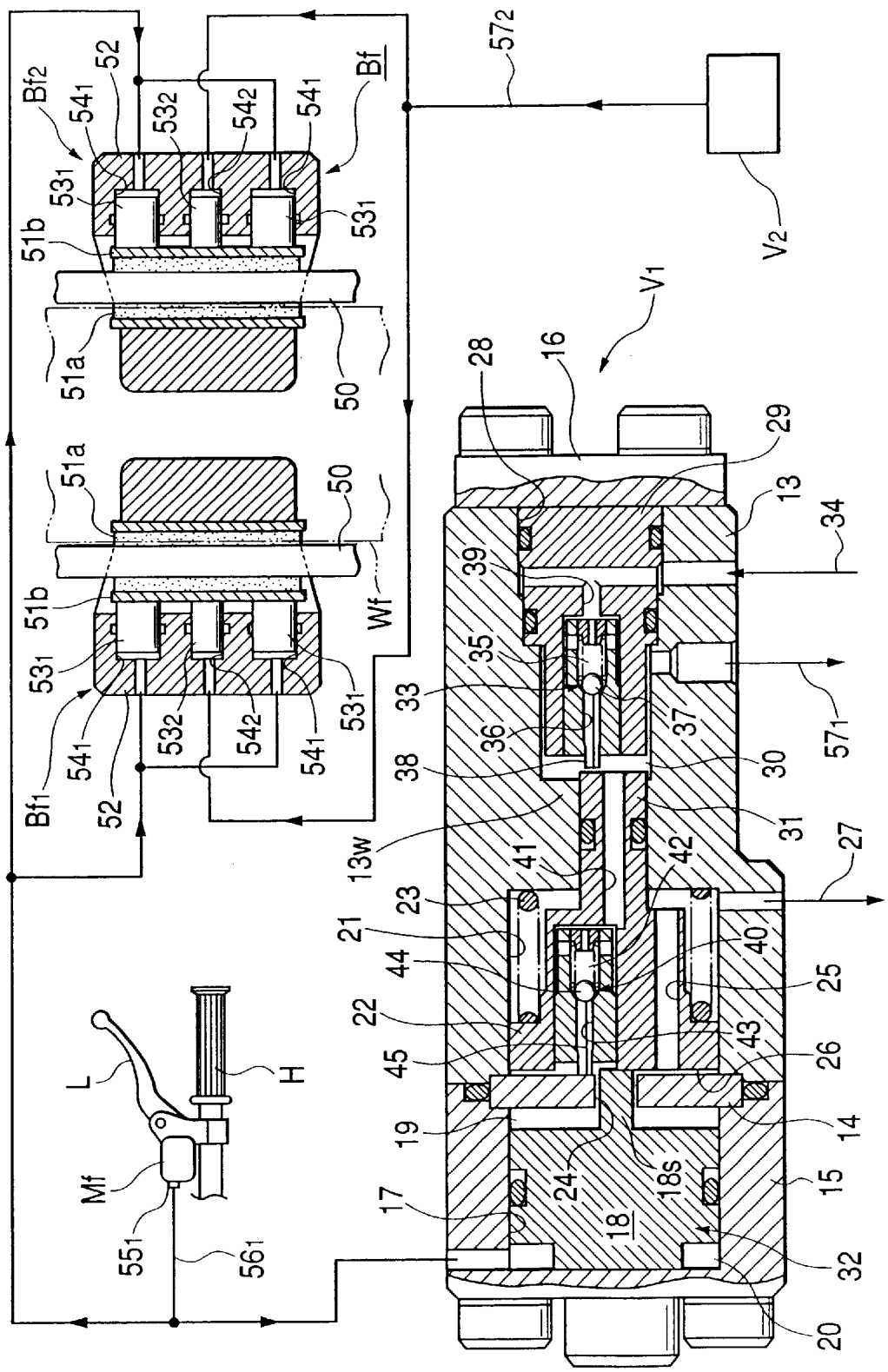
FIG. 4 shows an enlarged longitudinal sectional view showing a first proportional pressure intensification vale and a front wheel brake shown in FIG. 3.
Figure 5:
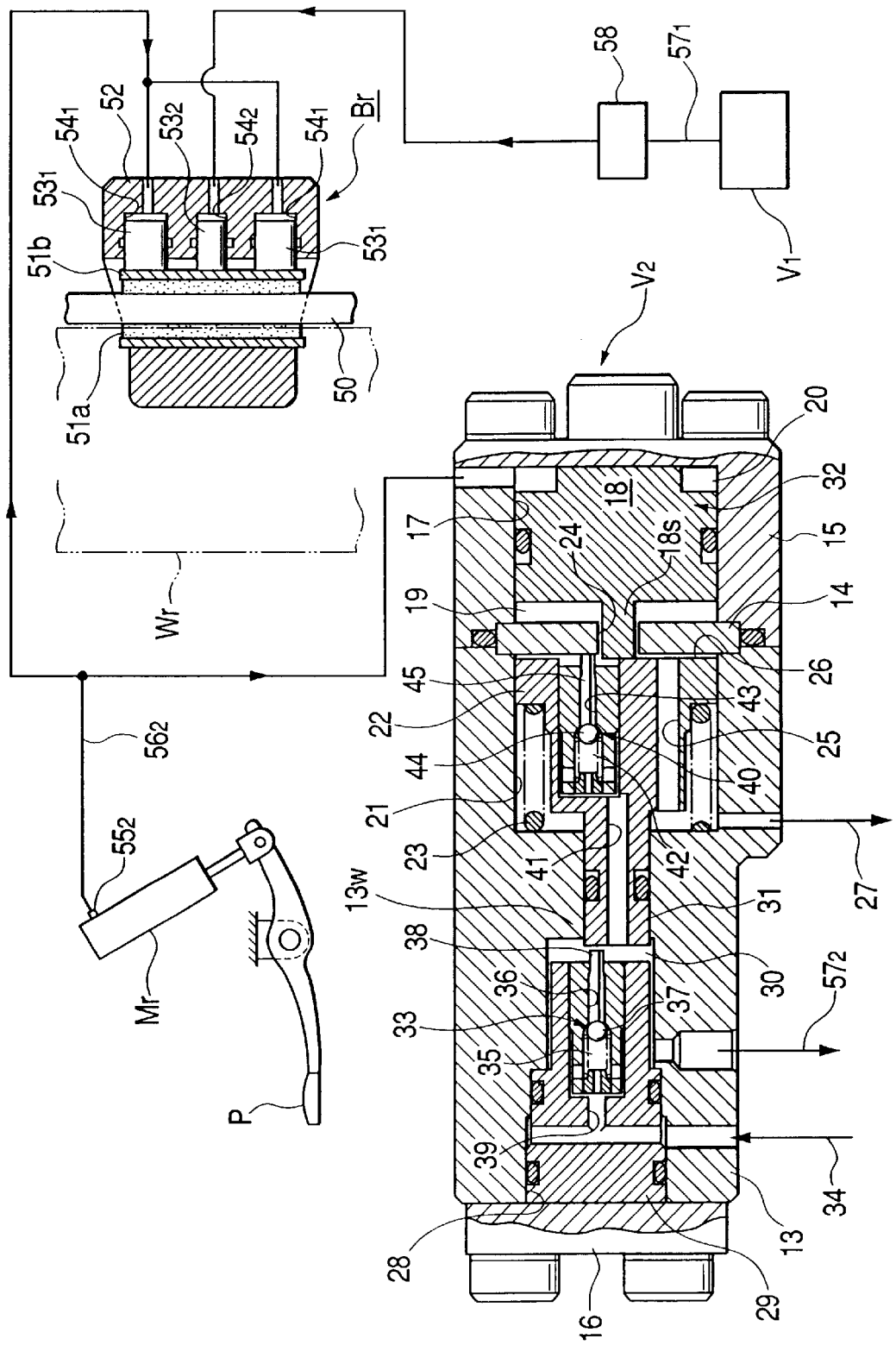
FIG. 5 shows an enlarged longitudinal sectional view showing a second proportional pressure intensification vale and a rear wheel shown in FIG. 3.
Figure 6:
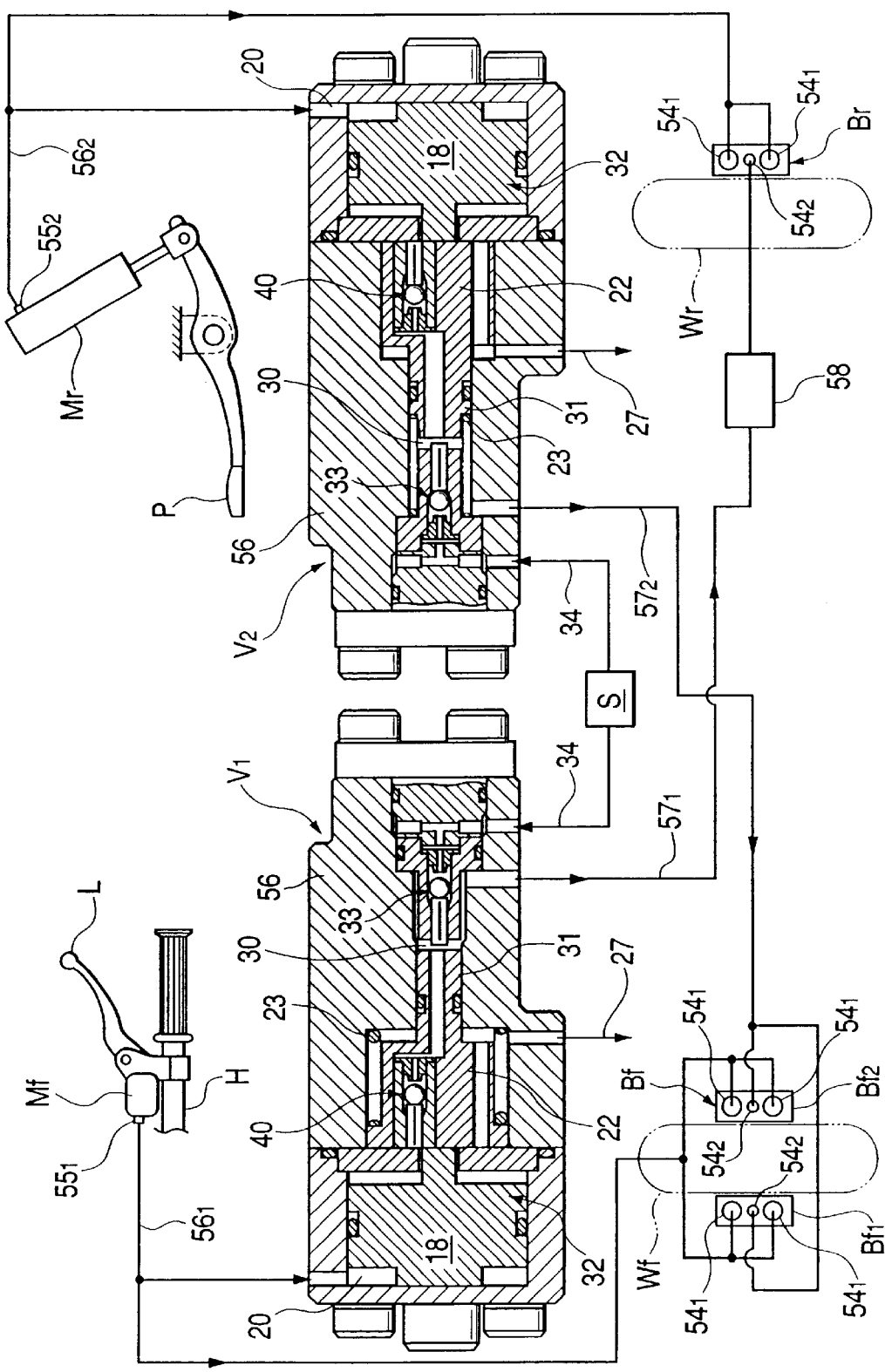
FIG. 6 shows a hydraulic circuit diagram of an automotive two-wheeled vehicle braking system according to a third embodiment of the present invention with a main part of the braking system being shown in a longitudinal sectional view.

FIGS. 1 and 2 show a first embodiment of the present invention, in which FIG. 1 is a hydraulic circuit diagram for a braking system for an automotive four-wheeled vehicle and FIG. 2 is an enlarged sectional view of a proportional pressure intensification valve shown in FIG. 1. FIGS. 3 to 5 show a second embodiment of the present invention, in which FIG. 3 is a hydraulic circuit diagram for a braking system for an automotive two-wheeled vehicle, FIG. 4 is an enlarged sectional view showing a first proportional pressure intensification valve and a front wheel brake shown in FIG. 3, and FIG. 5 an enlarged sectional view showing a second proportional pressure intensification valve and a rear wheel brake shown in FIG. 3. FIG. 6 is a hydraulic circuit diagram showing a longitudinal sectional view of a main part of a braking system for an automotive two-wheeled vehicle according to a third embodiment of the present invention.

First, the first embodiment will be described in which the present invention is applied to a braking system for an automotive four-wheeled vehicle.

In FIG. 1, this braking system for an automotive four-wheeled vehicle has a tandem-type master cylinder M. First and second output fluid passages $2_1$, $2_2$ extend from first and second output ports $1_1$, $1_2$ of this master cylinder M. The first output fluid passage $2_1$ is bifurcated on a downstream side thereof, and one of the bifurcated fluid passages connects to a left rear wheel brake Bra for braking a left rear wheel, while the other connects to an input portion of a first proportional pressure intensification valve V1. The second output fluid passage 22 is also bifurcated on a downstream side thereof, and one of the bifurcated fluid passages connects to a right rear brake for braking a right rear brake, while the other connects to a second proportional pressure intensification valve V2.

The first and second proportional pressure intensification valves V1, V2 are adapted to draw from a common source of hydraulic pressure S and output boosting hydraulic pressures in proportion to hydraulic pressures outputted from the first and second output ports $1_1$, $1_2$ of the master cylinder M, respectively, and first and second boosted fluid passages $3_1$, $3_2$ extending from output portions of the first and second proportional pressure intensification valves V1, V2 connect, respectively, to left and right front wheel brakes Bfa, Bfb for braking left and right front wheels.

The source of hydraulic pressure S is driven by an electric motor 4 and comprises a hydraulic pump 6 for sucking a hydraulic fluid from a reservoir 5 and an accumulator 7 for accumulating the hydraulic pressure outputted the hydraulic pump 6. The electric motor 4 connects to a battery 9 via a normally-open contact 8a of a relay 8, and a normally-closed hydraulic pressure detection switch 10 adapted to be switched on when the hydraulic pressure of the accumulator 7 becomes equal to or larger than a regulated value is inserted in a circuit for connecting a coil 8b of the relay 8 to the battery 9 for connection thereto. Therefore, if the hydraulic pressure of the accumulator 7 is less than the regulated value, the relay 8 is put in an ON state, and the electric motor 4 is then caused to operate to drive the hydraulic pump 6. When the hydraulic pressure of the accumulator 7 reaches or exceeds the regulated value, the hydraulic pressure detection switch 10 is put in an OFF state, and this puts the relay 8 in an OFF state, whereby the driving of the hydraulic pump 6 by the electric motor 4 is automatically stopped. Thus, a hydraulic pressure equal to or larger than the regulated value is designed to be accumulated in the accumulator 7 at all times.

As shown in FIG. 2, a casing 13 of the first proportional pressure intensification valve Vf has a cap 15 joined to one end thereof with a bulkhead plate 14 being held therebetween and a lid plate 16 joined to the other end thereof. The cap 15 has a first bottomed cylinder bore 17 an open side of which is closed with the bulkhead plate 14, and the interior of the cylinder bore 17 is partitioned into an atmospheric pressure chamber 19 formed on the bulkhead plate side and a hydraulic pressure controlling chamber 20 formed on an opposite side to the atmospheric pressure chamber 19 by a control piston 18 slidably fitted in the first cylinder bore 17, a downstream end of the other bifurcated fluid passage of the first output fluid passage $2_1$ connecting to the hydraulic pressure controlling chamber 20.

The casing 13 has a second bottomed cylinder bore 21 an open side of which is closed with the bulkhead plate 14. A valve piston 22 is slidably fitted in the second cylinder bore 21 and a return spring 23 is also accommodated in the same cylinder bore for biassing the piston 22 toward the bulkhead plate 14.

A through hole 24 is formed in a central portion of the bulkhead plate 14, while a small shaft 18s is provided at a central portion of the control piston 18 in such a manner as to protrude therefrom to penetrate loosely through the through hole 24 for abutment with an end face of the valve piston 22, whereby the control piston 18 can push on the valve piston 22 via this small shaft 18s.

Provided in the valve piston 22 are a through hole 25 for establishing a communication between both end faces thereof and a groove 26 communicating with the through hole 24, whereby respective portions in the interior of the second cylinder bore 21 are caused to communicate with the atmospheric pressure chamber 19. A return fluid passage 27 connects to either this second cylinder bore 21 or the atmospheric pressure chamber 19, and a downstream end of this return fluid passage 27 connects to a suction fluid passage 11 connecting the reservoir 5 with the hydraulic pump 6.

In addition, a bottomed mounting bore 28 is formed in the casing 13 that aligns coaxially with the second cylinder bore 21 with a bulkhead 13w formed integrally with the casing 13 being held therebetween and an open side of which is closed with the lid plate 16, and a valve housing 29 is fixedly mounted thereon, whereby a hydraulic pressure boosting chamber 30 is defined at a bottom portion of the mounting bore 28. The first boosted fluid passage $3_1$ extends from this boosted fluid pressure chamber 30.

A reaction piston 31 is formed integrally with the valve piston 22 which penetrates through the bulkhead 13w slidably and fluid-tightly and faces the hydraulic pressure boosting chamber 30 at a leading end thereof. The diameter of this reaction piston 31 is made sufficiently smaller than that of the control piston 18.

A first communicating fluid passage 39 is formed in the valve housing 29 for connecting a high pressure fluid passage 34 extending from the accumulator 7 with the hydraulic pressure boosting chamber 30, and an inlet valve 33 is interposed in this first communicating fluid passage 39. The inlet valve 33 comprises a valve chamber 35 formed in the first communicating fluid passage 39, a valve hole 36 formed in the first communicating fluid passage 39 for causing the valve chamber to communicate with the hydraulic pressure boosting chamber 30, a check valve 37 accommodated in the valve chamber 35 and biassed with a spring so as to close the valve hole 36 and a valve opening rod 38 adapted to penetrate loosely through the valve hole 36 so as to face the check valve 37, whereby the check valve 37 is opened by the valve opening rod 38 when it is pushed by an end face of the reaction piston 31. The inlet valve 33 is disposed eccentric to the reaction piston 31 such that the valve opening rod 38 does not interfere with a second communicating fluid passage 41, which will be described later, made to open into the end face of the reaction piston 31 when the valve opening rod 38 is pushed by the end face of the reaction piston 31.

In addition, the second communicating fluid passage 41 is formed in the valve piston 22 and the reaction piston 31 for connecting the hydraulic pressure boosting chamber 30 with the groove 26 of the valve piston 22 which communicates with the atmospheric pressure chamber 19, and an outlet valve 40 is interposed in this second communicating fluid passage 41. This outlet valve 40 comprises a valve chamber 42 formed in the second communicating fluid passage 41, a valve hole 43 formed in the second communicating fluid passage 41 for causing the valve chamber 42 to communicate with the groove 26 of the valve piston 22, a check valve 44 accommodated in the valve chamber 42 and biassed with a spring so as to close the valve hole 43 and a valve opening rod 45 adapted to penetrate loosely through the valve hole 43 so as to face the check valve 44, whereby the valve opening rod 45 is constructed so as to open the check valve 44 when it is pushed by the bulkhead 14 when the valve piston is withdrawn. The outlet valve 40 is disposed eccentric to the small shaft 18s so as to avoid the interference between the valve opening rod 45 and the small shaft 18s when the valve opening rod 45 is pushed by the bulkhead 14.

The second proportional pressure intensification valve V2 has the same construction as that of the first proportional pressure intensification valve V1 except that a downstream end of the other bifurcated fluid passage of the second output fluid passage 22 connects to the controlled fluid pressure chamber 20 thereof and that an upstream end of the second boosted fluid passage 32 connects to the hydraulic pressure boosting chamber 30.

Next, the operation of the first embodiment will be described below.

When the master cylinder M is operated through depression of a brake pedal P by the operator, output hydraulic pressures from the first and second output ports $1_1$, $1_2$ are first supplied to the left and right rear wheel brakes Bra, Brb through the first and second output fluid passages $2_1$, $2_2$, whereby these brakes Bra, Brb can be put into operation.

In addition, the output hydraulic pressures from the first and second output ports $1_1$, $1_2$ are also supplied to the hydraulic pressure controlling chambers 20 of the first and second proportional pressure intensification valves V1, V2 through the first and second output fluid passages $2_1$, $2_2$.

When the hydraulic pressure supplied to each of the hydraulic pressure controlling chambers 20 reaches or exceeds a predetermined value regulated by the return spring 23, since the control piston 18 moves forward together with the valve piston 22 by virtue of the hydraulic pressure while contracting the return spring 23, the valve opening rod 45 is released from the bulkhead 14 in the outlet valve 40 and the check valve 44 is closed. Following this, since the reaction piston 31 pushes on the valve opening rod 38 of the inlet valve 33 in conjunction with the forward movement of the valve piston 22, the check valve 37 is opened. Then, the hydraulic pressure in the accumulator 7 is transmitted to the hydraulic pressure boosting chamber 30 through the inlet valve 33. As a result of this, the hydraulic pressure acts on the end face of the reaction piston 31 to apply a reaction force, and this reaction force biasses the valve piston 22 and the control piston 18 in the withdrawal direction. As a result of this, when the reaction force becomes larger than the pressing force applied by the control piston 18 through the hydraulic pressure of the hydraulic pressure controlling chamber 20, the two pistons 18, 22 are withdrawn. When this happens, the inlet valve 33 is closed, while the outlet valve is opened, whereby the supply of hydraulic pressure from the accumulator 7 to the hydraulic pressure boosting chamber 30 is shut off, and the hydraulic pressure is allowed to leak from the hydraulic pressure boosting chamber 30 toward the atmospheric pressure chamber 19 side. Then, when the pushing force by the control piston 18 by the hydraulic pressure in the hydraulic pressure controlling chamber 20 balances with the reaction force, both the inlet valve 33 and the outlet valve 40 are closed, whereby the hydraulic pressure in the hydraulic pressure boosting chamber 30 is maintained as it is. On the other hand, the pushing force by the control piston 18 by the hydraulic pressure in the hydraulic pressure controlling chamber 20 exceeds the reaction force, the two pistons 18, 22 move forward again, and the outlet valve 40 is closed, while the inlet valve 33 is opened, and therefore, the supply of hydraulic pressure from the accumulator 7 to the hydraulic pressure boosting chamber 30 is resumed. By repeating these operations the hydraulic pressure in the hydraulic pressure boosting chamber 30 is controlled to be intensified in proportion to the hydraulic pressure in the hydraulic pressure controlling chamber 20 or the hydraulic pressure outputted from the master cylinder M.

The hydraulic pressure in the hydraulic pressure boosting chamber 30 is controlled as described above, and the controlled hydraulic pressure outputted from the first proportional pressure intensification valve V1 is supplied to the left front wheel brake Bfa through the first boosted fluid passage $3_1$, and the controlled hydraulic pressure from the second proportional pressure intensification valve V2 is supplied to the right front wheel brake Bfb through the second boosted fluid passage 32, whereby those brakes Bfa, Bfb can be strongly operated by virtue of the boosted hydraulic pressures.

Thus, since the first and second proportional pressure intensification valves V1, V2 are adapted to draw a boosting hydraulic pressure in proportion to an output hydraulic pressure outputted from the master cylinder from the source of hydraulic pressure S and to supply the boosted pressure to the left and right front wheel brakes Bfa, Bfb, these proportional pressure intensification valves V1, V2 and the source of hydraulic pressure S can be mounted on the vehicle body frame at positions higher than the suspension springs of the vehicle, and such mounting can suppress the increase in the unsprung load of the vehicle, thereby making it possible to maintain the good riding comfort. In addition, since almost all of the hydraulic pressure delivered by the master cylinder M is supplied to the left and right rear wheel brakes Bra, Brf, the amount of hydraulic or pressurized fluid to be delivered by the master cylinder or the distance of the brake pedal depressing stroke can be suppressed to a low level.

Next, referring to FIGS. 3 to 5, a second embodiment will be described in which the present invention is applied to a braking system for an automotive two-wheeled vehicle.

As shown in FIGS. 3 and 4, a front wheel master cylinder Mf (a first master cylinder) adapted to be operated by a brake lever L is mounted on a steering handle bar H of an automotive two-wheeled vehicle. A pair of left and right or first and second disc brakes Bf1, Bf2 is disposed on sides of a front wheel Wf for braking the same, and a front wheel brake Bf is constituted by these first and second disc brakes Bf1, Bf2.

The first and second disc brakes Bf1, Bf2 are arranged transversely symmetrically relative to the front wheel Wf, and each comprises a brake disc 50 fixedly secured to a side of a hub of the front wheel Wf, a pair of left and right friction pads 51a, 51b disposed so as to face, respectively, sides of the brake disc 50 and a brake caliper 52 straddling the brake disc 50 with these friction pads 51a, 51b being held therein. The brake caliper 52 is mounted transversely slidably on a front fork, and the friction pads 51a, 51b are supported by a bracket secured to the brake caliper 52 or the front fork. Three wheel cylinders $54_1$, $54_2$, $54_1$ accommodating slidably therein three pistons $53_1$, $53_2$, $53_1$ facing the back of the friction pad 51b of the pair of friction pads are provided in parallel with each other on the brake caliper 52, and the wheel cylinders $54_1$, $54_1$ situated at outboard positions on the brake caliper communicate with each other and are adapted to function as a primary wheel cylinder, and the central wheel cylinder $54_2$ is adapted to function as a secondary wheel cylinder which is independent from the primary wheel cylinders $54_1$, $54_1$. Then, the pressure receiving area of the secondary wheel cylinder $54_2$ of the front wheel brake Bf is set smaller than the pressure receiving area of a primary wheel cylinder $54_1$ of a rear wheel brake Br which will be described later.

A first output fluid passage $56_1$ extending from an output port $55_1$ of the front wheel master cylinder Mf is bifurcated on a downstream side thereof and one of bifurcated fluid passages connects to the primary wheel cylinders $54_1$ of the front wheel brake Bf and the other connects to a first proportional pressure intensification valve V1.

The first proportional pressure intensification valve V1 is adapted to draw a boosting hydraulic pressure in proportion to a output hydraulic pressure outputted from the front wheel master cylinder Mf from a source of hydraulic pressure S and to supply the boosted hydraulic pressure to a secondary wheel cylinder $54_2$ of the rear wheel brake Br, which will be described later. In other words, the first output fluid passage $56_1$ connects to a hydraulic pressure controlling chamber 20 of the first proportional pressure intensification valve V1, and a hydraulic pressure boosting chamber 30 connects to the secondary wheel cylinder $54_2$ of the rear wheel brake Br, which will be described later, via a first boosted fluid passage $57_1$. A hydraulic pressure limit valve 58 is interposed along the first boosted fluid passage $57_1$ for shutting off the same fluid passage $57_1$ when the hydraulic pressure on the upstream side thereof reaches or exceeds a predetermined value. Since the other constituent portions of the first proportional pressure intensification valve V1 are basically the same as those of the first and second proportional pressure intensification valves V1, V2 described as to the first embodiment, in the figures like reference numerals are imparted to like portions corresponding to those described with respect to the first embodiment, and the description thereof will be omitted here.

In addition, as shown in FIGS. 3 and 5, mounted on the body frame of the automotive two-wheeled vehicle is a rear wheel master cylinder Mr (a second master cylinder) which is adapted to be operated by a brake pedal P. A rear wheel brake Br is disposed on one side of a rear wheel Wf for braking the same. This rear wheel brake Br is constituted by a disc brake, and the construction thereof is similar to those of the respective disc brakes Bf1, Bf2 of the front wheel brake Bf, in which wheel cylinders $54_1$, $54_1$ situated at outboard positions on the brake caliper 52 are adapted to function as primary wheel cylinders, while the central wheel cylinder $54_2$ is adapted to function as a secondary wheel cylinder $54_2$. The pressure receiving area of the secondary wheel cylinder $54_2$ of the rear wheel brake Br is set smaller than the pressure receiving area of the primary cylinder $54_1$ of the front wheel brake Bf.

In this rear wheel brake Br, like reference numerals are imparted to portions like to those of the respective disc brakes Bf1, Bf2 of the front wheel brake Bf, and the description thereof will be omitted here.

A second output fluid passage $56_2$ extending an output port $55_2$ of the rear wheel master cylinder Mr is bifurcated on a downstream side thereof, and one of bifurcated fluid passages connects to the primary wheel cylinders $54_1$ of the rear wheel brake Br, while the other connects to a second proportional pressure intensification valve V2.

The second proportional pressure intensification valve V2 is adapted to draw a boosting hydraulic pressure in proportion to an output hydraulic pressure outputted from the rear wheel master cylinder Mr from a source of hydraulic pressure S so as to supply the boosted hydraulic pressure to the secondary wheel cylinder 542 of the front brake Bf. In other words, the first output fluid passage $56_1$ connects to a hydraulic pressure controlling chamber 20 of the second proportional pressure intensification valve V2, and a hydraulic pressure boosting chamber 30 connects to the secondary wheel cylinder $54_2$ of the front wheel brake Bf via a second boosted fluid passage $57_2$. The other constituent portions of the second proportional pressure intensification valve V2 are basically similar to those of the first proportional pressure intensification valve V1, and therefore, in the figure, like reference numerals are imparted to like portions corresponding to those described previously.

As shown in FIG. 3, the source of hydraulic pressure S is commonly used by the first and second proportional pressure intensification valves V1, V2 and comprises a hydraulic pump 6 adapted to be driven by an electric motor 4 to draw a pressurized fluid from a reservoir 5 and an accumulator 7 for accumulating the discharge hydraulic pressure of the hydraulic pump 6. The electric motor 4 connects to a normally-open contact 8a of a relay 8 via a battery 9, and a normally-closed hydraulic pressure detection switch 10 adapted to be turned off when the hydraulic pressure in the accumulator 7 reaches or exceeds a regulated value and a manual switch 60 (an operation stopping means) adapted to be tuned on and off at will are connected in series to a circuit for connecting a coil 8b of the relay 8 to the battery 9. Therefore, if the hydraulic pressure of the accumulator 7 is less than the regulated value with the manual switch 60 being in an ON state, the relay 8 is turned on, and the electric motor 4 is started to operate so as to drive the hydraulic pump 6. On the contrary, when the hydraulic pressure in the accumulator 7 becomes equal to or larger than the regulated value, the hydraulic pressure detection switch 10 is put in an OFF state. This turns off the relay 8 and the driving of the hydraulic pump 6 by the electric motor 4 is automatically stopped. Thus, the hydraulic pressure of the regulated value is normally accumulated in the accumulator 7. In addition, even when the electric motor 4 is in operation, if the manual switch 60 is turned off, the operation of the electric motor 4 can be stopped.

An operation of the second embodiment will be described below.

When the brake lever L is manipulated to operate the front wheel master cylinder Mf in order to brake the front wheel Wf, the hydraulic pressure outputted from the master cylinder is then supplied via the first output fluid passage $56_1$ to the primary wheel cylinders $54_1$, $54_1$ of the front wheel brake Bf and the hydraulic pressure controlling chamber 20 of the first proportional pressure intensification valve V1. Then, the hydraulic pressure supplied to the primary wheel cylinders $54_1$, $54_1$ imparts a thrust to the primary pistons $53_1$, $53_1$. Thus, the two friction pads 51a, 51b are brought into pressure contact with the sides of the brake disc 50 by the forward movement of these primary pistons $53_1$, $53_1$ and the movement of the brake caliper 52 in an opposite direction to the primary pistons $53_1$, $53_1$ due to a reaction force generated by the forward movement of the primary pistons $53_1$, $53_1$, whereby a braking force is applied to the front wheel Wf.

On the other hand, when supplied with the hydraulic pressure at the hydraulic pressure controlling chamber 20 thereof as described above, the first proportional pressure intensification valve V1 operates in the same manner as the first proportional pressure intensification valve V1 of the previous embodiment and draws a boosting hydraulic pressure in proportion to the hydraulic pressure in the hydraulic pressure controlling chamber 20 from the source of hydraulic pressure S into the hydraulic pressure boosting chamber 30 so as to supply the boosted hydraulic pressure to the secondary wheel cylinder $54_2$ of the rear wheel brake Bf via the first boosted fluid passage $57_1$. Then, the two friction pads 51a, 51b of the rear wheel brake Br are also brought into pressure contact with the sides of the brake disc 50 through an operation similar to that taking place at the front wheel brake Bf, whereby a braking force is applied to the rear wheel Wf.

Thus, both the front wheel brake Bf and the rear wheel brake Br can be put into operation together by operating only the front wheel cylinder Mf.

In this case, since the front proportional pressure intensification valve V1 is constructed so as to start its operation only after the hydraulic pressure supplied from the front wheel master cylinder Mf into the hydraulic pressure controlling chamber 20 reaches or exceeds the regulated value which is regulated by the return spring 23, the boosted hydraulic pressure of the first proportional pressure intensification valve V1 is supplied to the secondary wheel cylinder $54_2$ of the rear wheel brake Br slightly after the hydraulic pressure of the front wheel master cylinder Mf is supplied to the primary wheel cylinders $54_1$ of the front wheel brake Bf, and therefore, the braking effect can be improved by making use of the increase in load of the front wheel entailed by the preceding operation by the front wheel brake Bf.

Moreover, the pressure receiving area of the primary wheel cylinder $54_1$ of the front wheel brake Bf is set larger than the pressure receiving area of the secondary wheel cylinder $54_2$ of the rear wheel brake Br such that the braking force provided by the hydraulic pressure of the primary wheel cylinder $54_1$ of the front wheel brake Bf becomes larger than the braking force provided by the hydraulic pressure of the secondary wheel cylinder $54_2$ of the rear wheel brake Br, a braking mode resulting in which the importance is attached to the braking by the front wheel brake Bf. A braking mode like this is applied to braking on a paved road having a high friction coefficient.

With a view to braking the rear wheel Wr, when the rear wheel master cylinder Mr is put into operation by manipulating the brake pedal P, the output hydraulic pressure outputted from the same master cylinder is supplied via the second output fluid passage $56_2$ to the primary wheel cylinders $54_1$, $54_1$ of the rear wheel brake Br and the hydraulic pressure controlling chamber of the second proportional pressure intensification valve V2. Then, at the rear wheel brake Br, the hydraulic pressure supplied to the primary wheel cylinders $54_1$, $54_1$ imparts a thrust to the primary pistons $53_1$, $53_1$ to put them in operation, whereby a braking force is applied to the rear wheel Wr.

On the other hand, at the second proportional pressure intensification valve V2 in which the output hydraulic pressure outputted from the rear wheel master cylinder Mr is supplied to the hydraulic pressure controlling chamber 20 thereof, a boosting hydraulic pressure in proportion to the hydraulic pressure in the hydraulic pressure controlling chamber 20 is drawn from the source of hydraulic pressure S into the hydraulic pressure boosting chamber 30 through a similar operation to that occurring with the first proportional pressure intensification valve V1, and the boosted hydraulic pressure is then supplied to the secondary wheel cylinder $54_2$ of the front wheel brake Bf via the second boosted fluid passage $57_2$, whereby the front wheel brake Bf is also put into operation to thereby apply a braking force to the front wheel Wf.

Thus, not only the rear wheel brake Br but also the front wheel brake Bf can be put into operation by operating only the rear wheel master cylinder Mr.

In this case, since the second proportional pressure intensification valve V2 is constructed so as to start its operation only after the hydraulic pressure supplied from the rear wheel master cylinder Mr into the hydraulic pressure controlling chamber 20 reaches or exceeds the regulated value which is regulated by the return spring 23, the boosted hydraulic pressure of the second proportional pressure intensification valve V2 is supplied to the secondary wheel cylinder $54_2$ of the front wheel brake Bf slightly after the hydraulic pressure of the rear wheel master cylinder Mr is supplied to the primary wheel cylinders $54_1$ of the rear wheel brake Br. Moreover, the pressure receiving area of the primary wheel cylinder $54_1$ of the rear wheel brake Br is set larger than the pressure receiving area of the secondary wheel cylinder $54_2$ of the front wheel brake Bf such that the braking force provided by the hydraulic pressure of the primary wheel cylinder $54_1$ of the rear wheel brake Bf becomes larger than the braking force provided by the hydraulic pressure of the secondary wheel cylinder $54_2$ of the front wheel brake Bf, a braking mode thus resulting in which the importance is attached to the braking by the rear wheel brake Br. A braking mode like this is generally applied to a rough road having a low friction coefficient, and the mode is also effective in avoiding the jackknifing of the vehicle.

In this second embodiment, too, since the first and second proportional pressure intensification valves V1, V2 and the source of hydraulic pressure S can be mounted on the vehicle body frame at positions higher than the suspension springs of the vehicle, such mounting can suppress the increase in unsprung load of the vehicle to thereby maintain the good riding comfort. In addition, since almost all of the pressurized fluid delivered by the front wheel master cylinder Mf is supplied to the front wheel Wf and almost all of the pressurized fluid delivered by the rear wheel master cylinder Mr is supplied to the rear wheel Wr, the pressurized fluid delivery amounts of the respective master cylinders Mf, Mr and hence the lengths of the operation strokes of the brake lever L and brake pedal P can be maintained small.

In a case where the front and rear wheel master cylinders Mf, Mr are put into operation simultaneously, in either of the front and rear wheel brakes Bf, Br, the hydraulic pressure is supplied to the all of the wheel cylinders $54_1$, $54_2$, and therefore, a strong braking force can be provided.

If the manual switch 60 in the source of hydraulic pressure S is turned off, the driving of the hydraulic pump 6 by the electric motor 4 can be stopped, and therefore, if the front and rear wheel master cylinders Mf, Mr are operated several times in this state, the accumulator 7 can be emptied of accumulated pressure. If this occurs, the first and second proportional pressure intensification valves V1, V2 are no longer able to supply the boosted hydraulic pressure to the secondary wheel cylinders $54_2$, $54_2$ of the front and rear wheel brakes Bf, Br. As a result of this, the front and rear wheel brakes Bf, Br can operate in the conventional and general independent operation mode.

Next, referring to FIG. 6, a third embodiment of the present invention will be described below.

In this third embodiment, too, the present invention is applied to the braking system for the automotive two-wheeled vehicle, but it is different from the second embodiment in construction as will be described below.

In the second proportional pressure intensification valve V2, the set load of the return spring 23 of the valve piston 22 is set far smaller than the set load of the return spring 23 on the first proportional pressure intensification valve V1 side, and the pressure receiving area of the reaction piston 31 is set larger than the pressure receiving area of the reaction piston 31 on the first proportional pressure intensification valve V1 side.

Since the other constituent portions of the third embodiment are similar to those of the second embodiment, in the figure like reference numerals are imparted to like portions to those described as to the second embodiment, thus the description thereof being omitted here.

With the above construction, since the set load of the return spring 23 of the second proportional pressure intensification valve V2 is made smaller, when the rear wheel master cylinder Mr is in operation, the front wheel brake Bf can be put into operation substantially simultaneously with the rear wheel brake Br by putting more forward the operation initiating timing of the second proportional pressure intensification valve V2 than the operation initiating timing of the first proportional pressure intensification valve V1, whereby the braking effect can be improved. In addition, since the pressure receiving area of the reaction piston 31 in the second proportional pressure intensification valve V2 is set larger, the boosting ratio of the second proportional pressure intensification valve V2 is lowered whereby the braking force of the front wheel brake Bf when the rear wheel master cylinder Mr is in operation can be weakened, thereby making it possible to improve the effectiveness in which the importance is attached to the braking by the rear wheel brake Br.

The present invention is not limited to the above embodiments but may be modified in design in various manners without departing the scope and sprint thereof. For example, in the second and third embodiments, the front brake Bf may be constituted by either the disc brake Bf1 or Bf2 only.

Next, hereinafter, brake systems for an automotive two-wheeled vehicle according to fourth and fifth embodiments of the invention will be explained in the accompanying drawings.

Figure 7:
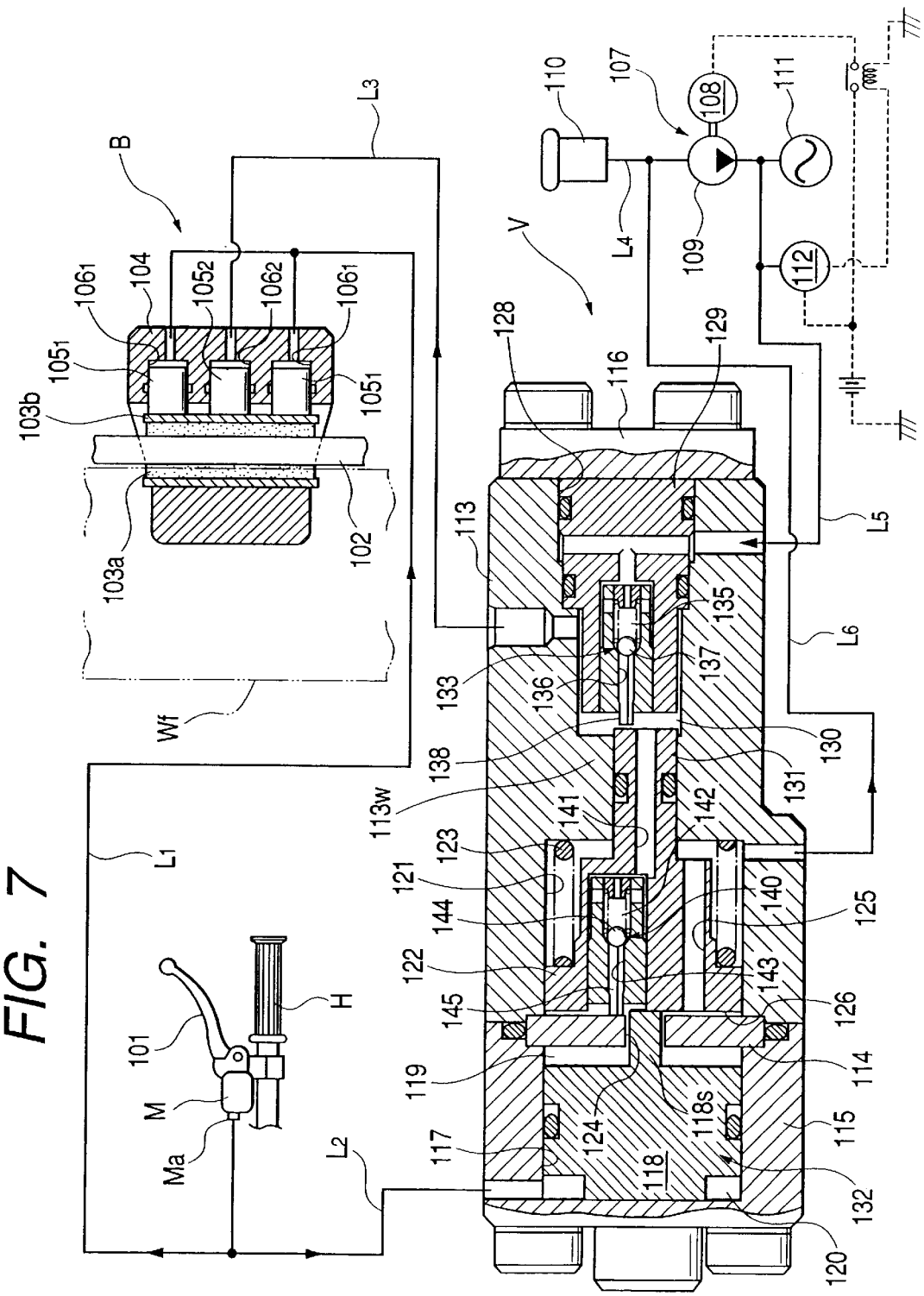
FIG. 7 shows an overall system diagram of a brake system for an automotive two-wheeled vehicle according to a fourth embodiment of the present invention with a main part thereof being shown in longitudinal cross-section.
Figure 8:
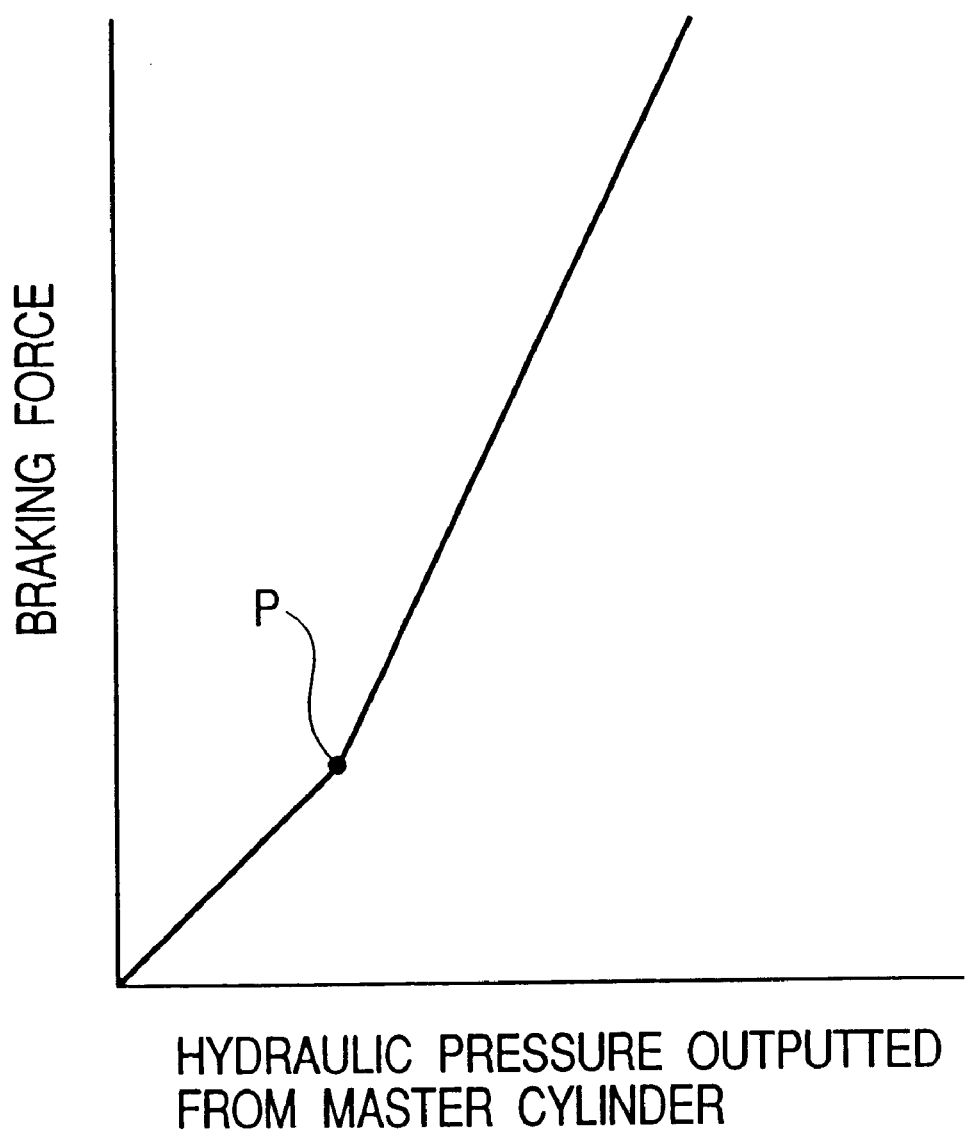
FIG. 8 shows a braking force characteristic diagram of the brake system.
Figure 9:
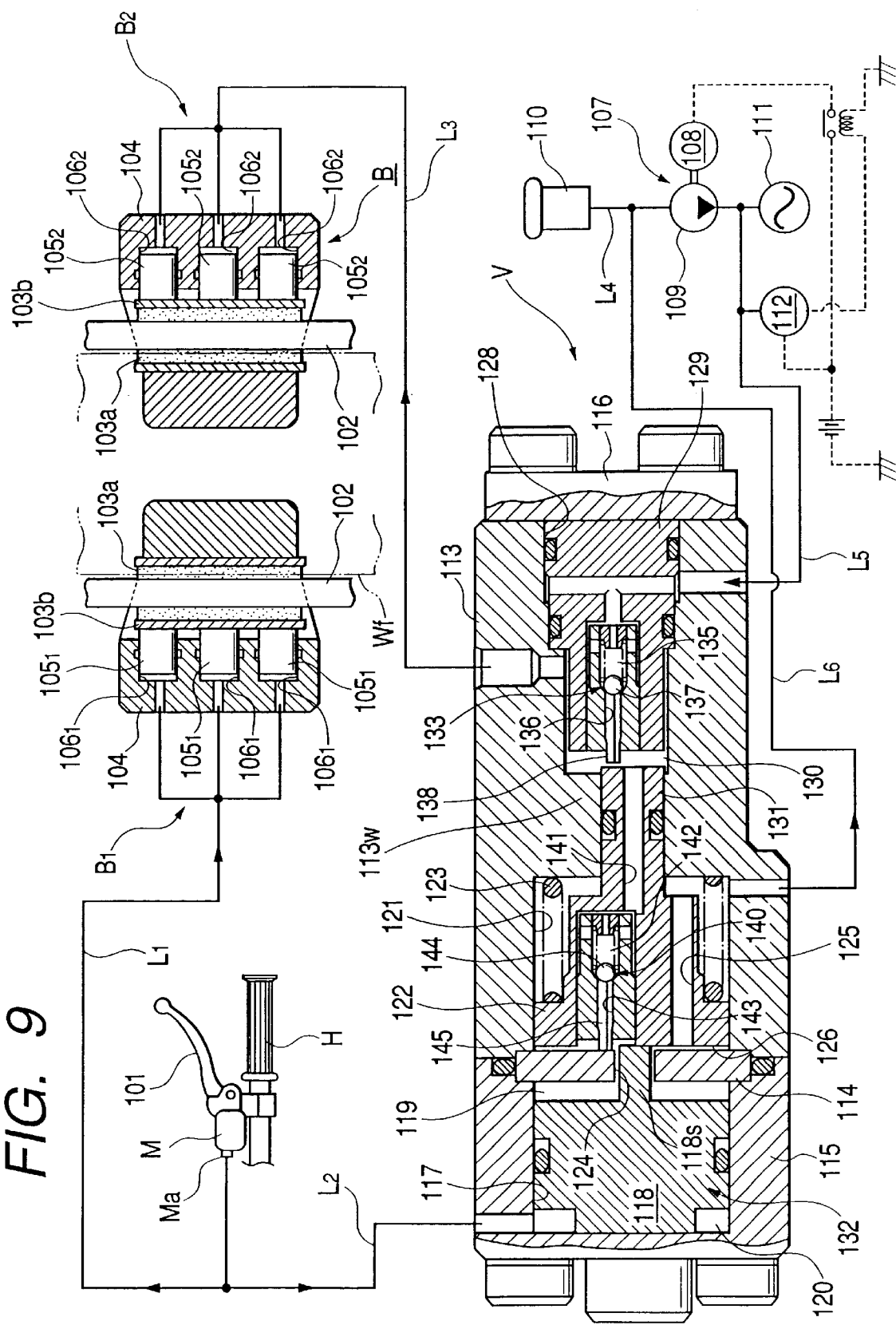
FIG. 9 shows an overall system diagram similar to FIG. 7 which shows a fifth embodiment of the present invention.

FIG. 7 is an overall system diagram of a brake system for an automotive two-wheeled vehicle according to a fourth embodiment of the present invention with a main part thereof being shown in longitudinal cross-section, FIG. 8 is a braking force characteristic diagram of the brake system, and FIG. 9 is an overall system diagram similar to FIG. 7 which shows a fifth embodiment of the present invention.

First, the fourth embodiment of the present invention will be described. In FIG. 7, a master cylinder M adapted to be operated by a brake lever 101 is mounted on a steering handle bar H of an automotive two-wheeled vehicle. A front wheel Wf functioning as a wheel is rotatably supported on a front fork (not shown) of the automotive two-wheeled vehicle, and the front wheel is constructed so as to be braked by a brake means B. This wheel brake means B is constituted by a disc brake disposed on at least one side of the front wheel Wf. In other words, the wheel brake means B comprises a brake disc 102 secured to one side of a hub of the front wheel Wf, a pair of left and right friction fads 103$a$, 103$b$ disposed on sides of this brake disc 102 in such a manner as to face each other across the brake disc 102 and a brake caliper 104 straddling the brake disc 102 with the friction pads 103$a$, 103$b$ being held therein. The brake caliper is mounted on the front fork in such a manner as to slide in transverse directions, and the friction pads 103$a$, 103$b$ are supported by a bracket secured to either the brake caliper 104 or to the front fork.

Three wheel cylinders 106$_1$, 106$_2$, 106$_1$ are provided together on the brake caliper which accommodate slidably three pistons 105$_1$, 105$_2$, 105$_1$ which face the back of the friction pad 103$b$, which is one of the friction pads 103$a$, 103$b$. The wheel cylinders 106$_1$, 106$_1$ disposed outboard communicate with each other and function as primary wheel cylinders, to which an output port Ma of the master cylinder connects via a hydraulic pressure conduit L1.

The central wheel cylinder 106$_2$ functions as a secondary cylinder which is independent from the primary wheel cylinders 106$_1$, 106$_1$, to which a proportional pressure intensification valve V connects via a hydraulic pressure conduit L3 which is adapted to operate in response to an output hydraulic pressure outputted from the master cylinder M to draw from a source of hydraulic pressure 107 a hydraulic pressure which is higher than the output hydraulic pressure from the master cylinder M.

The source of hydraulic pressure 107 is driven by an electric motor 108 and comprises a hydraulic pump 109 for sucking a hydraulic fluid from a reservoir 110 and an accumulator 111 for accumulating the discharge hydraulic pressure of the hydraulic pump 109. The hydraulic pressure of the accumulator 111 is detected by a hydraulic pressure sensor 112, and the hydraulic pump 109 is constructed so as to be actuated when the detected hydraulic pressure reaches or lower a lower limit, while it is constructed to be stopped when the detected hydraulic pressure reaches or exceeds an upper limit.

The proportional pressure intensification valve V comprises a casing 113, a cap 115 joined to one end of the casing 113 with a bulkhead plate 114 being held therebetween and a lid plate 116 joined to the other end of the casing 113. The cap 115 has a bottomed cylinder bore 117 an opening side of which is closed by the bulkhead plate 114. The interior of the cylinder bore 117 is partitioned by a control piston 118 slidably fitted therein into an atmospheric pressure chamber 119 on the bulkhead plate 114 side and a hydraulic pressure controlling chamber 120 on the opposite side. The output port Ma of the master cylinder connects to this hydraulic pressure controlling chamber 120 via a conduit L2.

The casing 113 has a bottomed cylinder bore 121 an opening side of which is closed with the bulkhead plate 114, and a valve piston 122 is slidably fitted in the cylinder bore 121. Also, a return spring 123 is accommodated therein for biasing the valve piston 122 toward the bulkhead plate 114.

A through hole 124 is formed in a central portion of the bulkhead plate 114, and a small shaft 118$s$ is provided on the control piston 118 in such a manner as to project therefrom such that the small shaft 118$s$ penetrates through the through hole 124 to come into abutment with an end face of the valve piston 122. The control piston 118 can push the valve piston 122 via this small shaft 118$s$.

Provided in the valve piston 122 are a through hole 125 communicating between ends thereof and a groove 126 in an end face confronting the bulkhead plate 114 for establishing a communication between the through hole 125 and the through hole 124, and the respective portions inside the cylinder bore 121 of the casing 113 communicate with the atmospheric pressure chamber 119 via the through hole 125 and the groove 126. A return fluid passage L6 connects to either this cylinder bore 121 or to the atmospheric pressure chamber 119, and a downstream end of this return fluid passage L6 connects to a suction passage L4 between the reservoir 110 and the hydraulic pump 109.

Formed in the casing 113 is a bottomed mounting bore 128 aligned coaxially with the cylinder bore 121 across a bulkhead 113$w$ formed integrally with the casing 113 and an opening side of which is closed by the lid plate 116. A valve housing 129 is fixedly mounted in the mounting bore 128, whereby a hydraulic pressure boosting chamber 130 is defined in a bottom portion of the mounting bore 128. This hydraulic pressure boosting chamber 130 connects to the secondary wheel cylinder 106$_2$ via a hydraulic pressure conduit L3. A reaction piston 131 is formed integrally with the valve piston 122 which penetrates through the bulkhead 113$w$ fluid-tightly and slidably to face the hydraulic pressure boosting chamber 130 at a distal end thereof. The diameter of this reaction piston 131 is made smaller than that of the control piston 118.

An inlet valve 133 is provided in the valve housing 129 for opening and closing a fluid passage between the accumulator 111 and the hydraulic pressure boosting chamber 130. In other words, the inlet valve 133 comprises a valve chamber 135 to which a high pressure fluid passage L5 extending from the accumulator 111 connects, a valve hole 136 for causing the valve chamber 135 to communicate with the hydraulic pressure boosting chamber 130, a check valve 137 accommodated in the valve chamber 135 and biased with a spring so as to close the valve hole 136 and a valve opening rod 138 penetrating loosely through the valve hole 136 to face the check valve 127, whereby the valve opening rod 138 is constructed so as to open the check valve 137 when it is pushed by the reaction piston 131.

An outlet valve 140 is provided in the valve piston 122 for opening and closing a fluid passage between the hydraulic pressure boosting chamber 130 and the groove 126 in the valve piston 122. In other words, the outlet valve 140 comprises a valve chamber 142 communicating with the hydraulic pressure boosting chamber 130 via a through hole 141 in the reaction piston 131, a valve hole 143 for causing the valve chamber 142 to communicate with the groove 126 in the piston valve 122, a check valve 144 accommodated in the valve chamber 142 and biassed with a spring to close the valve hole 143 and a valve opening rod 145 penetrating loosely through the valve hole 143 to face the check valve 144, whereby the valve opening rod 145 is constructed so as to open the check valve 144 when it is pushed by the bulkhead plate 114 when the valve piston 122 is withdrawn.

The source of hydraulic pressure 107 and the proportional pressure intensification valve V are both mounted on the upper portion of the front fork or the body frame at positions higher than the suspension springs of the automotive two-wheeled vehicle.

Next, an operation of this embodiment will be described.

With a view to braking the front wheel Wf, when the brake lever 101 is operated to actuate the master cylinder M, an output hydraulic pressure outputted from the master cylinder M is divided into the hydraulic pressure conduits L1, L2 to be supplied to the primary wheel cylinders $106_1$, $106_2$ of the brake caliper 104 and the hydraulic pressure controlling chamber 120 of the proportional pressure intensification valve V. The hydraulic pressure supplied to the primary wheel cylinders $106_1$, $106_2$ then imparts a thrust to. the primary pistons $105_1$, $105_2$, whereby the forward movement of the primary pistons $105_1$, $105_2$ and the movement of the brake caliper 104 in the opposite direction to the primary pistons $105_1$, $105_2$ by virtue of a reaction force generated by the forward movement of the primary pistons bring the two friction pads 103a, 103b into pressure contact with the sides of the brake disc 102 to thereby impart a braking force to the front wheel Wf.

On the other hand, the hydraulic pressure supplied to the hydraulic pressure controlling chamber 120 of the proportional pressure intensification valve V imparts a thrust to the control piston 118. When the thrust reaches or exceeds a predetermined value regulated by a set load of the return spring 123, the control piston 118 moves forward together with the valve piston 122 while contracting the return spring 123, and in the outlet valve 140, the valve opening rod 145 is released from the bulkhead plate 114, and the check valve 144 is then closed. Following this, when the valve piston moves forward, the reaction piston 138 pushes on the valve opening rod 138 of the inlet valve 133, whereby the check valve 137 is opened. Then, the hydraulic pressure in the accumulator 111 is transmitted to the hydraulic pressure boosting chamber 130 through the inlet valve 133. This hydraulic pressure is then applied to an end face of the reaction piston 131 to impart a reaction force, and this reaction force biases the valve piston 122 and the control piston in a withdrawal direction. As a result of this, when this reaction force becomes larger than a pushing force of the control piston 118 by virtue of the hydraulic pressure of the hydraulic pressure controlling chamber 120, both the pistons 118, 122 are withdrawn, and the inlet valve 133 is closed, whereby the outlet valve 140 is opened and the supply of hydraulic pressure to the accumulator 111 is shut off and the hydraulic pressure is caused to leak from the hydraulic pressure boosting chamber 130 to the atmospheric pressure chamber 119 side. Then, when the pushing force of the control piston 118 generated by the hydraulic pressure in the hydraulic pressure controlling chamber 120 balances with the aforesaid reaction force, both the inlet valve 133 and the outlet valve 140 are closed to thereby maintain the hydraulic pressure boosting chamber 130. On the other hand, when the pushing force of the control piston 118 generated by the hydraulic pressure in the hydraulic pressure controlling chamber 120 exceeds the aforesaid reaction force, the two pistons 118, 122 both move forward again and the outlet valve 140 is closed, while the inlet valve 133 is opened, whereby the supply of hydraulic pressure from the accumulator 111 to the hydraulic pressure boosting chamber 130 is resumed. The hydraulic pressure in the hydraulic pressure boosting chamber 130 is controlled to be intensified by repeating the aforesaid operations in proportion to the hydraulic pressure in the hydraulic pressure controlling chamber 120 or the output hydraulic pressure outputted from the master cylinder M.

The hydraulic pressure in the hydraulic pressure boosting chamber 130 which is controlled as described above is supplied to the secondary wheel cylinder $106_2$ of the brake caliper 104 via the hydraulic pressure conduit L3 to impart a thrust to the secondary piston $105_3$, thereby making it possible to intensify the pressure contacting force of the two friction pads 103a, 103b with the brake disc 102 or the braking force of the front wheel Wf in proportion to the output hydraulic pressure outputted from the master cylinder M.

Thus, the hydraulic pressure of the hydraulic pressure boosting chamber 130 keeps imparting the reaction force to the reaction piston 131, and it is hydraulically fed back to the brake lever 101 via the master cylinder M, whereby the operator senses the magnitude of the hydraulic pressure of the hydraulic pressure boosting chamber 130 or the braking force, thereby making it possible to obtain a good operating feeling.

FIG. 8 shows a relationship between the operation force applied to the master cylinder M and the braking force applied to the front wheel Wf while the aforesaid operations are carried out. In FIG. 8, a deviation point P is where the boosted hydraulic pressure of the proportional pressure intensification valve is generated, and as described above, when the generation timing of the boosted hydraulic pressure is suitably delayed from the generation timing of the output hydraulic pressure of the master cylinder M by selecting the set load of the return spring 123 of the control piston 118, the control of the braking force can be carried out finely and easily.

Thus, the operator can strongly brake the front wheel Wf by imparting a relatively small magnitude of operation force to the master cylinder M. Moreover, the source of hydraulic pressure 107 and the proportional pressure intensification valve V which are used to impart the boosted hydraulic pressure to the wheel brake means B can be freely mounted on the upper portion of the front fork or the body frame at positions higher than the suspension springs of the automotive two-wheeled vehicle, and such mounting can help suppress the increase in unsprung load of the automotive two-wheeled vehicle to thereby maintain the good riding comfort.

In addition, even if there occur a failure in the source of hydraulic pressure 107, thereby making it impossible for the hydraulic pressure boosting chamber 130 to be intensified in pressure, the output hydraulic pressure of the master cylinder M can be supplied to the primary wheel cylinders $106_1$, $106_1$, and therefore, the wheel brake means B can be actuated by the forward movement of the primary wheel cylinders $105_1$, $105_1$ only, whereby a fail-safe function can be secured.

Next, when the operation force being applied to the brake lever 101 is released to allow the master cylinder M to return to the non-operating state, the primary wheel cylinders $106_1$, $106_1$, and the hydraulic pressure controlling chamber 120 are reduced in pressure without any delay. When the pressure in the hydraulic pressure controlling chamber 120 is reduced, the valve piston 122 withdraws together with the control piston 118 by virtue of the biassing force of the return spring 123, and in conjunction with this, the inlet valve 133 is closed, while the outlet valve 140 is opened, whereby the supply of the hydraulic pressure from the accumulator 111 to the hydraulic pressure boosting chamber 130 is shut off, and the hydraulic pressure in the hydraulic pressure boosting chamber 130 and the secondary wheel cylinder $106_2$ is allowed to return to the return fluid passage L6 and then to the reservoir 110 via the outlet valve 140 or to be sucked again by the hydraulic pump 109. Thus, the wheel brake means B returns to the non-operating state to thereby release the front wheel Wf.

As with this fourth embodiment, it is effective in attempting to simplify the construction of the brake means B to constitute the wheel brake means B by the disc brake disposed on one side of the front wheel Wf and to provide the primary and secondary wheel cylinders on the caliper 104.

Next, referring to FIG. 9, a fifth embodiment of the present invention will be described below.

In this fifth embodiment, the wheel brake means B is constituted by first and second disc brakes B1, B2 disposed on the sides of the front wheel Wf. Calipers 104 of these first and second disc brakes B1, B2 each comprise one or a plurality of wheel cylinders $106_1$, $106_2$ accommodating one or a plurality of pistons $105_1$, $105_1$, and the other constituent portions of the respective disc brakes B1, B2 are basically identical to the disc brake B which is the wheel brake means of the previous embodiment.

The wheel cylinder $106_1$ of the first disc brake B1 is made to function as the primary wheel cylinder and the wheel cylinder $106_2$ of the second disc brake B2 is made to function as the secondary wheel cylinder $106_2$. Therefore, the output port Ma of the master cylinder M connects to the primary wheel cylinder $106_1$ via the hydraulic pressure conduit L1, and the hydraulic pressure boosting chamber 130 of the proportional pressure intensification valve connects to the secondary wheel cylinder $106_2$ via the hydraulic pressure conduit L3. Since the other constituent portions of the braking system are identical to those described as to the fourth embodiment, in the figure, like reference numerals are given to like portions to those described as to the previous embodiment, a description thereof being omitted.

Thus, when the master cylinder M is operated by manipulating the brake lever 101, the first disc brake B1 is able to be actuated by virtue of the output hydraulic pressure outputted from the master cylinder M, and the second disc brake B2 is able to be actuated by virtue of the output hydraulic pressure outputted from the hydraulic pressure boosting chamber 130 of the proportional pressure intensification valve V.

When the source of hydraulic pressure 107 fails, since the first disc brake B1 is allowed to operate normally by virtue of the output hydraulic pressure outputted from the master cylinder M, in this fifth embodiment, too, the fail-safe can be secured.

In addition, as described above, it is effective in improving the braking effect of the front wheel Wf to constitute the wheel brake means B by the first and second disc brakes B1, B2 disposed on the sides of the front wheel Wf and to make the wheel cylinder $106_1$ of the first disc brake B1 and the wheel cylinder $106_2$ of the second disc brake B2 to function as the primary wheel cylinder and the secondary wheel cylinder, respectively.

The present invention is not limited to the above embodiments but may be modified in design in various ways without departing from the scope and sprit thereof. For example, in the fourth embodiment, a pair of the disc brakes B each comprising the primary and secondary wheel cylinders $106_2$ may be disposed on left- and right-hand sides of the front wheel Wf. In addition, the braking system of the present invention may be embodied for the rear wheel of the automotive two-wheeled vehicle.

Thus, as has been described heretofore, according to the first feature of the invention, there is provided a vehicle braking system comprising a master cylinder adapted to be operated by an operator, a source of hydraulic pressure and proportional pressure intensification valves for each drawing a boosting hydraulic pressure in proportion to a hydraulic pressure outputted from the master cylinder from the source of hydraulic pressure into a hydraulic pressure boosting chamber thereof, wherein output ports of the master cylinder are connected to one of pairs of front wheels and rear wheels and wherein the output chambers of the proportional pressure intensification valves are connected to the other pair of the pairs of front wheels and rear wheels. With this construction, when the master cylinder is in operation, one of the pairs of front wheel brakes and rear wheel brakes can be operated by virtue of the hydraulic pressure outputted from the master cylinder, while the other of the pairs of the front wheel brakes and the rear wheel brakes can be operated by virtue of the boosted hydraulic pressure from the proportional pressure intensification valve. Moreover, these proportional pressure intensification valves and the source of hydraulic pressure can freely be mounted on the vehicle body frame at positions higher than the vehicle suspension springs, and such mounting can suppress the increase in unsprung load of the vehicle, thereby making it possible to maintain the good riding comfort. In addition, since almost all of the pressurized fluid delivered by the master cylinder is supplied to the one pair of wheel brakes, the amount of pressurized fluid to be delivered by the master cylinder or the length of the operating stroke of an operating member of the master cylinder can be suppressed to a low level. On the other hand, even if the other pair of wheel brakes that are operated by virtue of the boosting hydraulic pressure is miniaturized, a sufficient magnitude of braking force can be provided.

According to the second feature of the invention, there is provided a vehicle braking system wherein one of a front wheel brake and a rear wheel brake constitutes a first wheel brake and the other does a second wheel brake, wherein a primary wheel cylinder and a secondary wheel cylinder which are independent from each other are provided on at least the first wheel brake, and wherein output ports of a first master cylinder and a second master cylinder which are individually operated by an operator are connected, respectively, to the primary wheel cylinder of the first wheel brake and a wheel cylinder of the second wheel brake, and comprising a source of pressurized fluid and a proportional pressure intensification valve for drawing a boosting hydraulic pressure in proportion to a hydraulic pressure outputted from the first master cylinder into a hydraulic pressure boosting chamber thereof, the hydraulic pressure boosting chamber of the proportional pressure intensification valve being connected to a secondary wheel cylinder of the first wheel brake. With this construction, as with an automotive two-wheeled vehicle, even if there are provided front and rear wheel master cylinders, if only the first master cylinder is put into operation, not only does the hydraulic pressure outputted therefrom cause the first wheel brake to operate but also the boosted hydraulic pressure of the proportional pressure intensification valve causes the second wheel brake to operate, thus making it possible to attempt to simplify the braking operations. Of course, in this case, too, since the proportional pressure intensification valve and the source of pressure can be mounted on the vehicle body frame at positions higher than the suspension springs of the vehicle, such mounting can suppress the increase in the unsprung load of the vehicle, thereby making it possible to maintain the good riding comfort. In addition, since almost all of the pressurized fluid delivered by the first master cylinder is supplied to one of the wheel brakes, the amount of pressurized fluid so delivered thereby or the length of the operating stroke of the first master cylinder can be maintained small.

Furthermore, according to the third feature of the invention, there is provided a vehicle braking system wherein a primary wheel cylinder and a secondary wheel cylinder which are independent from each other are provided on a front wheel brake, wherein a primary wheel cylinder and a secondary wheel cylinder which are independent from each other are provided on a rear wheel brake, and wherein output ports of a front wheel master cylinder and a rear wheel master cylinder which are individually operated by an operator are connected, respectively, to the primary wheel cylinder of the front wheel brake and the primary wheel cylinder of the rear wheel brake, and comprising a source of pressurized fluid, a first proportional pressure intensification valve for drawing a boosting hydraulic pressure in proportion to a hydraulic pressure outputted from the front wheel master cylinder from the source of hydraulic pressure into a hydraulic pressure boosting chamber thereof, and a second proportional pressure intensification valve for drawing a boosting hydraulic pressure in proportion to a hydraulic pressure outputted from the rear wheel master cylinder from the source of hydraulic pressure into a hydraulic pressure boosting chamber thereof, the hydraulic pressure boosting chamber of the first proportional pressure intensification valve being connected to the secondary wheel cylinder of the rear wheel brake and the hydraulic pressure boosting chamber of the second proportional pressure intensification valve being connected to the secondary wheel cylinder of the front wheel brake. With this construction, when only the front wheel master cylinder is in operation, the front wheel brake is put into operation by virtue of the hydraulic pressure outputted therefrom, and the rear wheel brake is put into operation by virtue of the output hydraulic pressure outputted from the first proportional pressure intensification valve. On the other hand, when only the rear wheel master cylinder is in operation, the rear wheel is put into operation by virtue of the output hydraulic pressure outputted there form, and the front wheel brake is put into operation by virtue of the boosted hydraulic pressure from the second proportional pressure intensification valve, thereby making it possible to attempt to further simplify the braking operations. Of course, in this case, too, since the first and second proportional pressure intensification valves and the source of hydraulic pressure can freely be mounted on the vehicle body frame at positions higher than the suspension springs of the vehicle, such mounting can suppress the increase in the unsprung load of the vehicle, thereby making it possible to maintain the good riding comfort. In addition, since almost all of the pressurized fluid delivered by the front wheel master cylinder is supplied to the front brake and almost all of the pressurized fluid delivered by the rear wheel master cylinder is supplied to the rear wheel brake, the amounts of the pressurized fluid delivered by the respective master cylinders can be small and therefore, the lengths of the operating strokes of the respective master cylinders can be maintained short.

Furthermore, according to the fourth feature of the invention, in addition the third feature described above, there is provided a vehicle braking system wherein first and second proportional pressure intensification valves are constructed such that output characteristics thereof are differentiated from each other. With this construction, the operating characteristics of the front and rear wheel brakes can be differentiated by differentiating the output characteristics of the first and second proportional pressure intensification valves, whereby a braking system can be provided for a vehicle relatively easily which can meet an application thereof.

Moreover, according to the fifth feature of the invention, in addition to the third feature of the invention, there is provided a vehicle braking system, wherein the effective pressure receiving area of the secondary wheel cylinder of the front wheel brake is set smaller than the effective pressure receiving area of the primary wheel cylinder of the rear wheel brake, while the effective pressure receiving area of the secondary wheel cylinder of the rear brake is set smaller than the effective pressure receiving area of the primary wheel cylinder of the front brake, whereby the braking force of the front wheel becomes larger than that of the rear wheel brake when the front wheel master cylinder is in operation, while the braking force of the rear wheel brake becomes larger than that of the front wheel brake when the rear wheel master cylinder is in operation. With this construction, when the front wheel master cylinder is in operation, a state is provided in which the front and rear wheel brakes operate in an interlocking fashion with importance being attached to braking by the front wheel brake, while when the rear wheel master cylinder is in operation, a state is provided in which the front and rear wheel brakes operate in an interlocking fashion with importance being attached to braking by the rear wheel brake, thereby making it possible to obtain a good braking feeling free from a feeling of physical disorder as felt with a non-interlocking braking system for general automotive two-wheeled vehicles.

In addition, according to the sixth feature of the invention, in addition to any of the second to fifth features, there is provided a vehicle braking system wherein the proportional pressure intensification valves are constructed such that the proportional pressure intensification valves start to operate after the hydraulic pressures outputted from the master cylinders corresponding thereto increase to exceed certain levels. With this construction, a delay in operation initiating timing can be provided between the one of the wheel brakes which is operated by virtue of the hydraulic pressure outputted from the master cylinders and the other wheel brake operated by virtue of the boosted hydraulic pressure outputted from the proportional pressure intensification valves.

Furthermore, according to the seventh feature of the invention, in addition to any of the third to fifth features, there is provided a vehicle braking system wherein the second proportional pressure intensification valve is constructed such that the second proportional pressure intensification valve starts to operate after the hydraulic pressure outputted from the rear wheel master cylinder increases to exceed a certain level. With this construction, when the rear wheel master cylinder is in operation, the operation initiating timing of the front wheel brake is delayed from that of the rear wheel brake, whereby jackknifing of the vehicle body can be prevented at the time of hard or panic braking.

Moreover, according to the eighth feature of the invention, in addition to any of the second to seventh features, there is provided a vehicle braking system wherein an operation stopping means is provided on the source of hydraulic pressure for optionally stopping the operation of the source of hydraulic pressure. With this construction, the functions of the proportional pressure intensification valves can be stopped by stopping the operation of the source of hydraulic pressure by operating the operation stopping means. Thus, the front and rear wheel brakes can be operated in the general and conventional independent mode as required.

As has been described heretofore, according to the ninth feature of the invention, there is provided a braking system for automotive two-wheeled vehicles in which a primary wheel cylinder and a secondary wheel cylinder are provided on a wheel brake means for braking a wheel which are adapted to cause the wheel brake means to operate when the primary and secondary wheel cylinders are supplied with hydraulic pressure, respectively, characterized in that an output port of a master cylinder connects to the primary wheel cylinder, and that a hydraulic pressure boosting chamber of a proportional pressure intensification valve for drawing a boosting hydraulic pressure in proportion to a hydraulic pressure outputted from the master cylinder from a source of hydraulic pressure including a hydraulic pump connects to the secondary wheel cylinder. With this construction, when the master cylinder is in operation, the output hydraulic pressure outputted therefrom is supplied to the primary wheel cylinder, and the boosted hydraulic pressure outputted in proportion to the output hydraulic pressure from the master cylinder from the proportional pressure intensification valve is supplied to the secondary wheel cylinder, and therefore, the operator only has to apply a relative small magnitude of operation force to the master cylinder to strongly brake the front wheel. Moreover, the source of hydraulic pressure and the proportional pressure intensification valve which are used to supply the boosted pressure to the wheel brake means can be freely mounted on an upper portion of a front fork or a body frame of the automotive two-wheeled vehicle at positions higher than the suspension springs thereof, and such mounting can help suppress the increase in unsprung load of the automotive two-wheeled vehicle, thereby making it possible to maintain the good riding comfort. Furthermore, should there occur a failure in the source of hydraulic pressure, thereby making it impossible for the proportional pressure intensification valve to output any pressure, since the output hydraulic pressure outputted from the master cylinder can be supplied to the primary wheel cylinder, the wheel brake means is allowed to operate normally, a fail-safe function being thereby secured.

In addition, according to the tenth feature of the invention, there is provided a braking system for automotive two-wheeled vehicles, wherein the wheel brake means comprises a disc brake disposed on at least one side of the wheel and wherein the primary and secondary wheel cylinders are disposed together on a caliper of the disc brake, whereby the construction of the wheel brake means can be simplified.

Further, according to a eleventh feature of the invention, there is provided a braking system, wherein the wheel brake means comprises first and second disc brakes disposed on both sides of the wheel and wherein a wheel cylinder of the first disc brake is made to function as the primary wheel cylinder, while a wheel cylinder of the second disc brake is made to function as the secondary wheel cylinder, whereby the braking effect of the wheel can be improved.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A braking system for vehicle comprising:
   a first brake member;
   a second brake member independent from said first brake member;
   a master cylinder adapted to be operated by an operator, said master cylinder having an output part which is connected to said first brake member;
   a hydraulic pressure source; and
   a proportional pressure intensification valve for drawing a boosting hydraulic pressure in proportion to a hydraulic pressure outputted from said master cylinder from said hydraulic pressure source into a hydraulic pressure boosting chamber thereof,
   wherein said hydraulic pressure boosting chamber of said proportional pressure intensification valve is connected to said second brake member,
   wherein said vehicle comprises front and rear wheel brake mechanisms, at least one of said front and rear wheel brake mechanisms has a primary wheel cylinder and a secondary wheel cylinder which are adapted to cause said at least one said front and rear brake mechanism to operate when said primary and secondary wheel cylinders are supplied with hydraulic pressure, and said first brake member s said primary wheel cylinder of said at least one of front and rear wheel brake mechanisms, and said second brake member is said secondary wheel cylinder of said at least one of front and rear wheel brake mechanisms
   wherein said vehicle is an automotive two-wheeled vehicle, said at least one of said front rear wheel brake mechanisms comprises first and second disc brakes disposed on both sides of the respective wheel and wherein a wheel cylinder of said first disc brake is made to function as said primary wheel cylinder, while a wheel cylinder of said second disc brake is made to function as said secondary wheel cylinder.

2. A braking system for vehicle according to claim 1, wherein said vehicle is an automotive two-wheeled vehicle, said at least one of front and rear wheel brake mechanisms comprises a disc brake disposed on at least one side of the respective wheel, and said primary and secondary wheel cylinders are disposed together on a caliper of said disc brake.

3. A braking system for vehicle comprising:
   a first brake member;
   a second brake member independent from said first brake member;
   a master cylinder adapted to be operated by an operator, said master cylinder having an output part which is connected to said first brake member;
   a hydraulic pressure source; and
   a proportional pressure intensification valve for drawing a boosting hydraulic pressure in proportion to a hydraulic pressure outputted from said master cylinder from said hydraulic pressure source into a hydraulic pressure boosting chamber thereof,
   wherein said hydraulic pressure boosting chamber of said proportional pressure intensification valve is connected to said second brake member,
   wherein said vehicle comprises front and rear wheel brake mechanisms, at least one of said front and rear wheel brake mechanisms has a primary wheel cylinder and a secondary wheel cylinder which are adapted to cause said at least one said front and rear brake mechanism to operate when said primary and secondary wheel cylinders are supplied with hydraulic pressure, and said first brake member is said primary wheel cylinder of said at least one of front and rear wheel brake mechanisms, and said second brake member is said secondary wheel cylinder of said at least one of front and rear wheel brake mechanisms,
   wherein each of said front and rear wheel brake mechanisms has a wheel cylinder which is adapted to cause said respective wheel brake mechanism to operate, said first brake member is said wheel cylinder of one of said front and rear wheel brake mechanisms, and said second brake member is said wheel cylinder of the other of said front and rear wheel brake mechanisms.

4. A braking system for vehicle comprising:

a first brake member;

a second brake member independent from said first brake member;

a master cylinder adapted to be operated by an operator, said master cylinder having an output part which is connected to said first brake member;

a hydraulic pressure source; and a proportional pressure intensification valve for drawing a boosting hydraulic pressure in proportion to a hydraulic pressure outputted from said master cylinder from said hydraulic pressure source into a hydraulic pressure boosting chamber thereof, wherein said hydraulic pressure boosting chamber of said proportional pressure intensification valve is connected to said second brake member, wherein said vehicle comprises front and rear wheel brake mechanisms, each of said front and rear wheel brake mechanisms has a primary wheel cylinder and a secondary wheel cylinder which are adapted to cause said respective wheel brake mechanism, and said first brake member is said primary wheel cylinder of one of said front and rear wheel brake mechanisms, and said second brake member is said secondary wheel cylinder of the other of said front and rear wheel brake mechanisms, wherein said master cylinder comprises a front wheel master cylinder with an output port connected to said primary wheel cylinder of said front wheel brake, and also a rear wheel master cylinder with an output port connected to said primary wheel cylinder of said rear wheel brake, said front and wheel master cylinders being independently operated by the operator, and said pressure intensification valve comprises a first proportional pressure intensification valve for drawing a boosting hydraulic pressure in proportion to a hydraulic pressure outputted from said front wheel master cylinder from said source of hydraulic pressure into a hydraulic pressure boosting chamber thereof, and a second proportional pressure intensification valve for drawing a boosting hydraulic pressure in proportion to a hydraulic pressure outputted from said rear wheel master cylinder from said source of hydraulic pressure into a hydraulic pressure boosting chamber thereof, wherein said hydraulic pressure boosting chamber of said first proportional pressure intensification valve is connected to said secondary wheel cylinder of said rear wheel brake, and said hydraulic pressure boosting chamber of said second proportional pressure intensification valve is connected to said secondary wheel cylinder of said front wheel brake.

5. A vehicle braking system according to claim 4, wherein said first and second proportional pressure intensification valves are different in its output characteristic from each other.

6. A vehicle braking system as set forth in claim 4, wherein the effective pressure receiving area of said secondary wheel cylinder of said front wheel brake is set smaller than the effective pressure receiving area of said primary wheel cylinder of said rear wheel brake, while the effective pressure receiving area of said secondary wheel cylinder of said rear wheel brake is set smaller than the effective pressure receiving area of said primary wheel cylinder of said front wheel brake.

7. A vehicle braking system as set forth in claim 4, wherein said proportional pressure intensification valve is constructed such that said proportional pressure intensification valve starts to operate after the hydraulic pressures outputted from said master cylinder is reached to a predetermined value or more.

8. A vehicle braking system according to claim 4, wherein said second proportional pressure intensification valve is constructed such that said second proportional pressure intensification valve starts to operate after the hydraulic pressure outputted from said rear wheel master cylinder is reached to a predetermined value or more.

9. A vehicle braking system according to claim 4, wherein an operation stopping mechanism is provided on said hydraulic pressure source for optionally stopping the operation of said source of hydraulic pressure.

10. A vehicle braking system comprising:

a front wheel brake;

a rear wheel brake;

a master cylinder adapted to be operated by an operator, said master cylinder having output ports which are connected to one of said front wheel brake and said rear wheel brake;

a hydraulic pressure source;

a proportional pressure intensification valve for drawing a boosting hydraulic pressure in proportion to a hydraulic pressure outputted from said master cylinder from said hydraulic pressure source into a hydraulic pressure boosting chamber thereof, wherein said hydraulic pressure boosting chamber of said proportional pressure intensification valve is connected to the other of said front wheel brake and said rear wheel brake, said front wheel brake comprises a primary wheel cylinder and a secondary wheel cylinder independent from said primary wheel cylinder, said rear wheel brake comprises a primary wheel cylinder and a secondary wheel cylinder independent from said primary wheel cylinder, said master cylinder comprises a front wheel master cylinder with output port connected to said primary wheel cylinder of said front wheel brake, and also a rear wheel master cylinder with output port connected to said primary wheel cylinder of said rear wheel brake, said front and wheel master cylinders being independently operated by the operator, and said pressure intensification valve comprises a first proportional pressure intensification valve for drawing a boosting hydraulic pressure in proportion to a hydraulic pressure outputted from said front wheel master cylinder from said source of hydraulic pressure into a hydraulic pressure boosting chamber thereof, and a second proportional Pressure intensification valve for drawing a boosting hydraulic pressure in proportion to a hydraulic pressure outputted from said rear wheel master cylinder from said source of hydraulic pressure into a hydraulic pressure boosting chamber thereof, wherein said hydraulic pressure boosting chamber of said first proportional pressure intensification valve is connected to said secondary wheel cylinder of said rear wheel brake, and said hydraulic pressure boosting chamber of said second proportional pressure intensification valve is connected to said secondary wheel cylinder of said front wheel brake.

11. A vehicle braking system according to claim 10, wherein each of said front and rear wheel brakes comprises a primary wheel cylinder and a secondary wheel cylinder in dependent from said primary wheel cylinder, wherein said output port of said master cylinder is connected to said primary wheel cylinder of the one of said front and rear wheel brakes, and said hydraulic pressure boosting chamber of said proportional pressure intensification valve is connected to said secondary wheel cylinder of the other of said front said rear wheel brakes.

12. A braking system for automotive two-wheeled vehicle comprising:

a wheel brake mechanism for braking a wheel, said wheel brake mechanism having a primary wheel cylinder and a secondary wheel cylinder and are adapted to cause said wheel brake mechanism to operate when said primary and secondary wheel cylinders are supplied with hydraulic pressure, respectively;

a master cylinder adapted to be. operated by an operator, said master cylinder having an output port which connects to said primary wheel cylinder;

a hydraulic pressure source including a hydraulic pump; and a proportional pressure intensification valve for drawing a boosting hydraulic pressure in proportion to a hydraulic pressure outputted from said master cylinder from the hydraulic pressure source into a hydraulic pressure boosting chamber thereof, said hydraulic pressure boosting chamber being connected to said secondary wheel cylinder, wherein said wheel brake mechanism comprises first and second disc brakes disposed on both sides of said wheel and wherein a wheel cylinder of said first disc brake is made to function as said primary wheel cylinder while a wheel cylinder of said second disc brake is made to function as said secondary wheel cylinder.

13. A braking system for automotive two-wheeled vehicles as set forth in claim 12, wherein said wheel brake mechanism comprises a disc brake disposed on at least one side of said wheel, and said primary and secondary wheel cylinders are disposed together on a caliper of said disc brake.

* * * * *